(12) United States Patent
Presby

(10) Patent No.: US 12,005,825 B2
(45) Date of Patent: *Jun. 11, 2024

(54) LOADING/UNLOADING DEVICE FOR A DELIVERY VEHICLE

(71) Applicant: David William Presby, Sugar Hill, NH (US)

(72) Inventor: David William Presby, Sugar Hill, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/252,461

(22) PCT Filed: Mar. 31, 2021

(86) PCT No.: PCT/US2021/025024
§ 371 (c)(1),
(2) Date: May 10, 2023

(87) PCT Pub. No.: WO2022/103425
PCT Pub. Date: May 19, 2022

(65) Prior Publication Data
US 2023/0331134 A1 Oct. 19, 2023

Related U.S. Application Data

(63) Continuation-in-part of application No. 17/094,291, filed on Nov. 10, 2020, now Pat. No. 11,364,834.

(51) Int. Cl.
*B60P 1/44* (2006.01)
*B62D 65/02* (2006.01)
*B65G 67/04* (2006.01)

(52) U.S. Cl.
CPC .......... *B60P 1/4428* (2013.01); *B60P 1/4471* (2013.01); *B62D 65/02* (2013.01); *B65G 67/04* (2013.01)

(58) Field of Classification Search
CPC ...... B60P 1/4428; B60P 1/4471; B62D 65/02; B65G 67/04
See application file for complete search history.

(56) References Cited

U.S. PATENT DOCUMENTS

| 2,394,148 A | 2/1946 | Campbell |
| 2,732,960 A | 1/1956 | Nilson |

(Continued)

FOREIGN PATENT DOCUMENTS

| EP | 3 000 696 A1 | 3/2016 |
| GB | 2 291 396 A | 1/1996 |

(Continued)

OTHER PUBLICATIONS

International Search Report Corresponding to PCT/US2021/025024 dated Jun. 23, 2021.

(Continued)

*Primary Examiner* — Saul Rodriguez
*Assistant Examiner* — Ashley K Romano
(74) *Attorney, Agent, or Firm* — Finch & Maloney PLLC

(57) ABSTRACT

A loading/unloading device for delivering an item(s) to be delivered. The loading/unloading device includes an outer nested track; an inner nested track nested within the outer nested track; a curved generally U-shaped guide track nested within the inner nested track; and a movable trolley accommodated and movable along the curved generally U-shaped guide track. A drive motor being is supported by a first end of the curved generally U-shaped guide track for conveying the movable trolley back and forth along the curved generally U-shaped guide track for loading and unloading the item(s) to be delivered. A delivery vehicle, including at least one loading/unloading device for delivering the item(s) to be delivered, is also disclosed.

19 Claims, 37 Drawing Sheets

(56) References Cited

U.S. PATENT DOCUMENTS

| | | |
|---|---|---|
| 2,798,621 A | 7/1957 | Tracy |
| 3,074,570 A | 1/1963 | Venziani |
| 3,721,355 A | 3/1973 | Irving |
| 3,811,579 A | 5/1974 | Black |
| 3,861,547 A | 1/1975 | Sink, Sr. |
| 3,910,433 A | 10/1975 | Love |
| 3,937,337 A | 2/1976 | Irving |
| 4,124,099 A | 11/1978 | Dudynskyj |
| 4,579,503 A | 4/1986 | Disque |
| 4,690,609 A | 9/1987 | Brown |
| 4,836,736 A | 6/1989 | Neagu |
| 5,067,869 A | 11/1991 | Reuss et al. |
| 5,118,246 A | 6/1992 | Saussard et al. |
| 5,253,973 A | 10/1993 | Fretwell |
| 5,544,796 A | 8/1996 | Dubach |
| 5,556,250 A | 9/1996 | Fretwell et al. |
| 5,785,375 A | 7/1998 | Alexander et al. |
| 6,435,804 B1 | 8/2002 | Hutchins |
| 6,558,106 B2 | 5/2003 | Sardonico |
| 6,739,825 B2 | 5/2004 | Beck et al. |
| 7,033,128 B2 | 4/2006 | Poindexter |
| 7,648,324 B1 | 1/2010 | Jensen |
| 7,762,756 B1 | 7/2010 | Ablabutyan et al. |
| 8,322,580 B1 | 12/2012 | Hamilton |
| 8,505,141 B1 | 8/2013 | Morris et al. |
| 8,534,732 B2 | 9/2013 | Bourgraf et al. |
| 8,821,103 B1 | 9/2014 | Matthews |
| 9,095,482 B2 | 8/2015 | Gressett et al. |
| 9,545,869 B2 | 1/2017 | Eidsmore |
| 9,603,760 B2 | 3/2017 | Beck |
| 9,840,180 B2 * | 12/2017 | Killgour ................. B60P 3/122 |
| 10,005,628 B2 * | 6/2018 | Soule ................... B65G 69/003 |
| 10,035,447 B2 | 7/2018 | Miles |
| 10,220,759 B2 | 3/2019 | Ablabutyan et al. |
| 10,596,949 B2 | 3/2020 | Jeong |
| 11,091,081 B1 | 8/2021 | Romero |
| 11,214,438 B2 * | 1/2022 | DeWitt ................... B65G 1/04 |
| 11,414,020 B2 * | 8/2022 | Daniels .................. B60R 9/048 |
| 2002/0114688 A1 | 8/2002 | Poindexter et al. |
| 2002/0136625 A1 | 9/2002 | Namgung |
| 2005/0036867 A1 | 2/2005 | Dyck |
| 2005/0186057 A1 | 8/2005 | Reicks |
| 2006/0051191 A1 | 3/2006 | Dupuy et al. |
| 2007/0048116 A1 | 3/2007 | Friedrich |
| 2011/0229294 A1 | 9/2011 | Gale |
| 2013/0004276 A1 | 1/2013 | Bark |

FOREIGN PATENT DOCUMENTS

| | | |
|---|---|---|
| WO | 95/18725 A1 | 7/1995 |
| WO | 03/093055 A1 | 11/2003 |

OTHER PUBLICATIONS

Written Opinion Corresponding to PCT/US2021/025024 dated Jun. 23, 2021.

Bullen, Donovan, "Israeli Tow-Truck," (Posted Jan. 18, 2011), Retrieved from https://www.youtube.com/watch?v=brOGiCsSOvU, Screenshots from video, 3 pgs.

Grown Men Stuff, "This Is How They Tow Vehicles in Europe." (Posted Apr. 5, 2017), Retrieved from https://www.facebook.com/grownmenstuff/videos/1880364848880067/, Screenshots from video, 3 pgs.

* cited by examiner

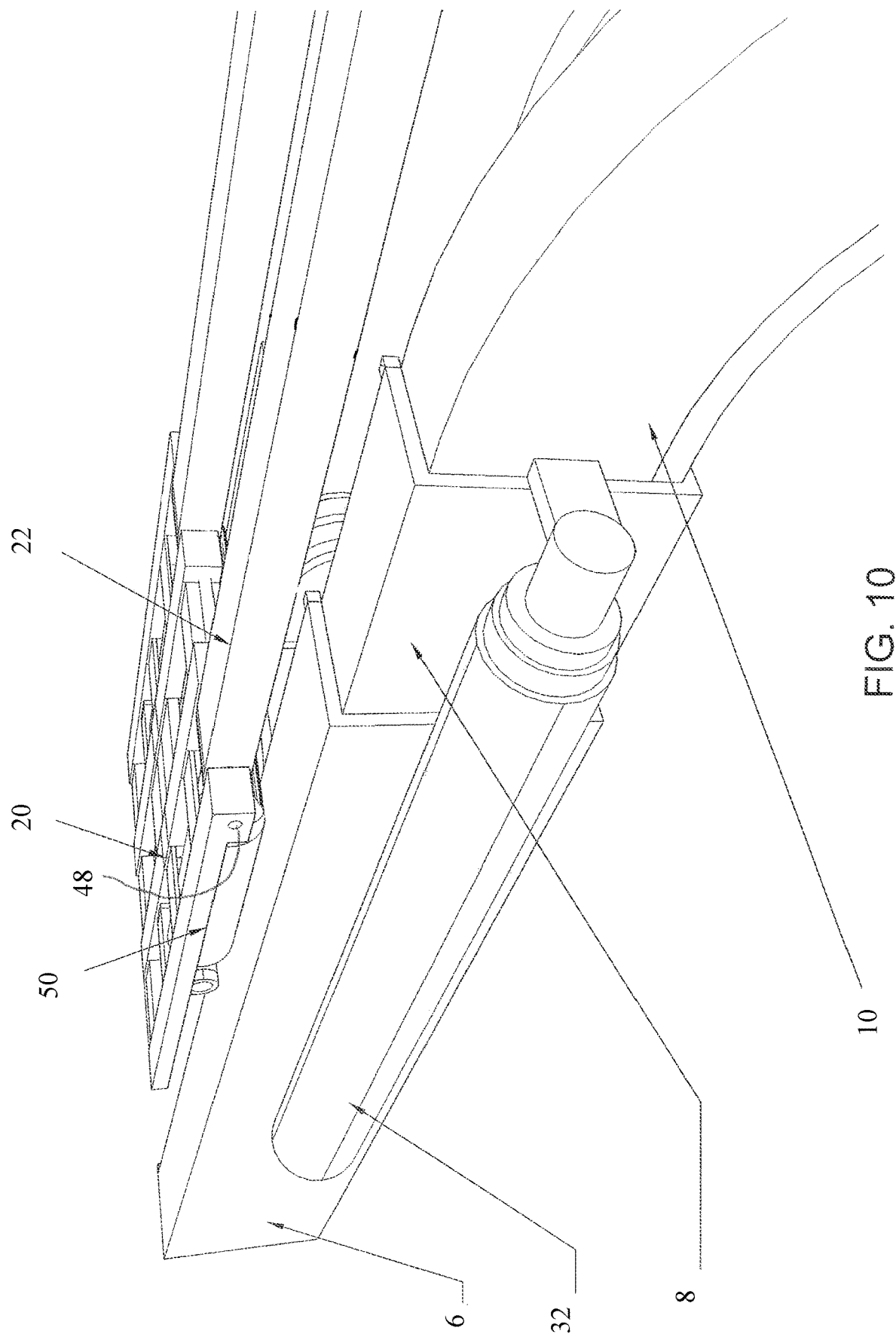

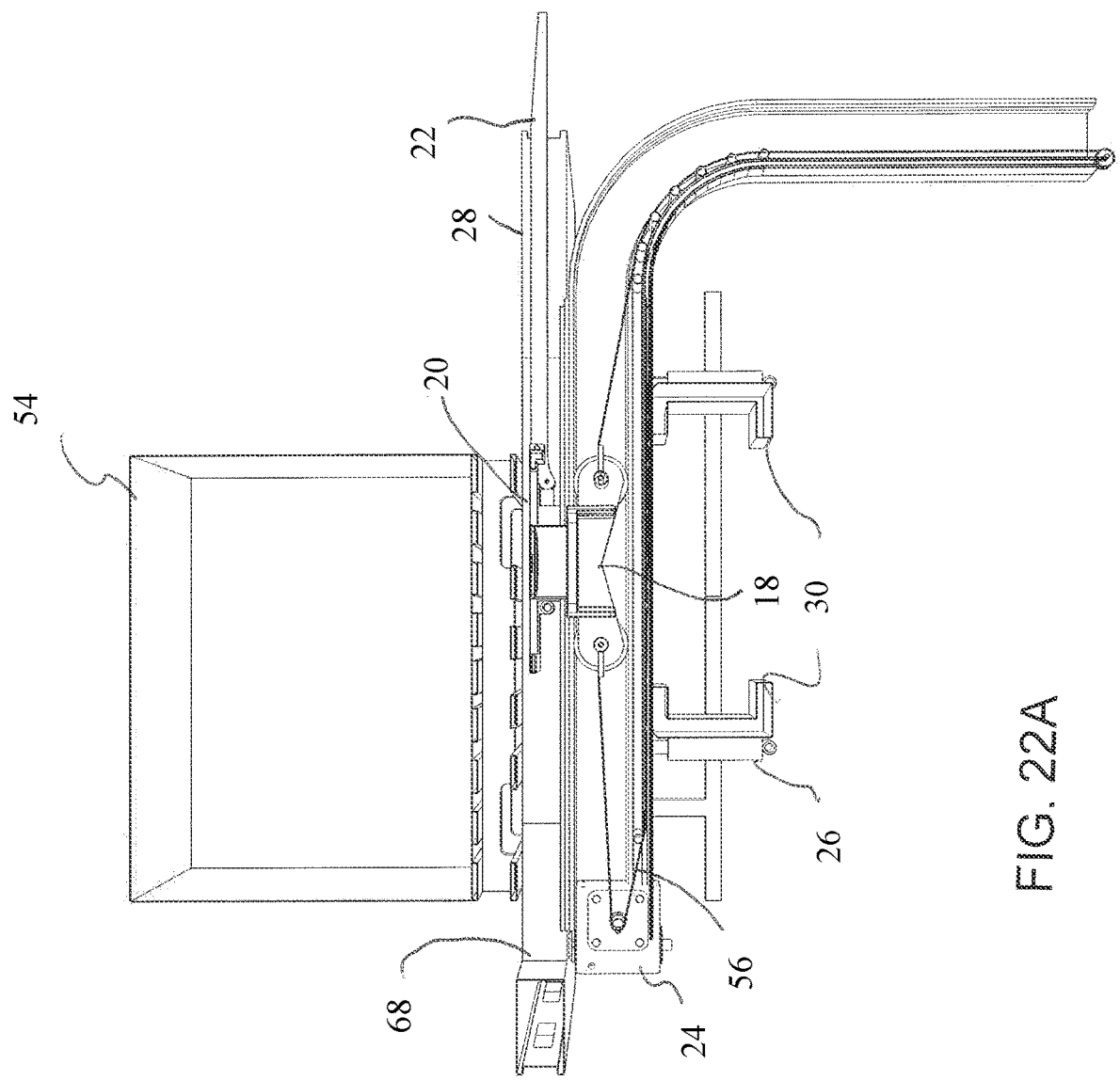

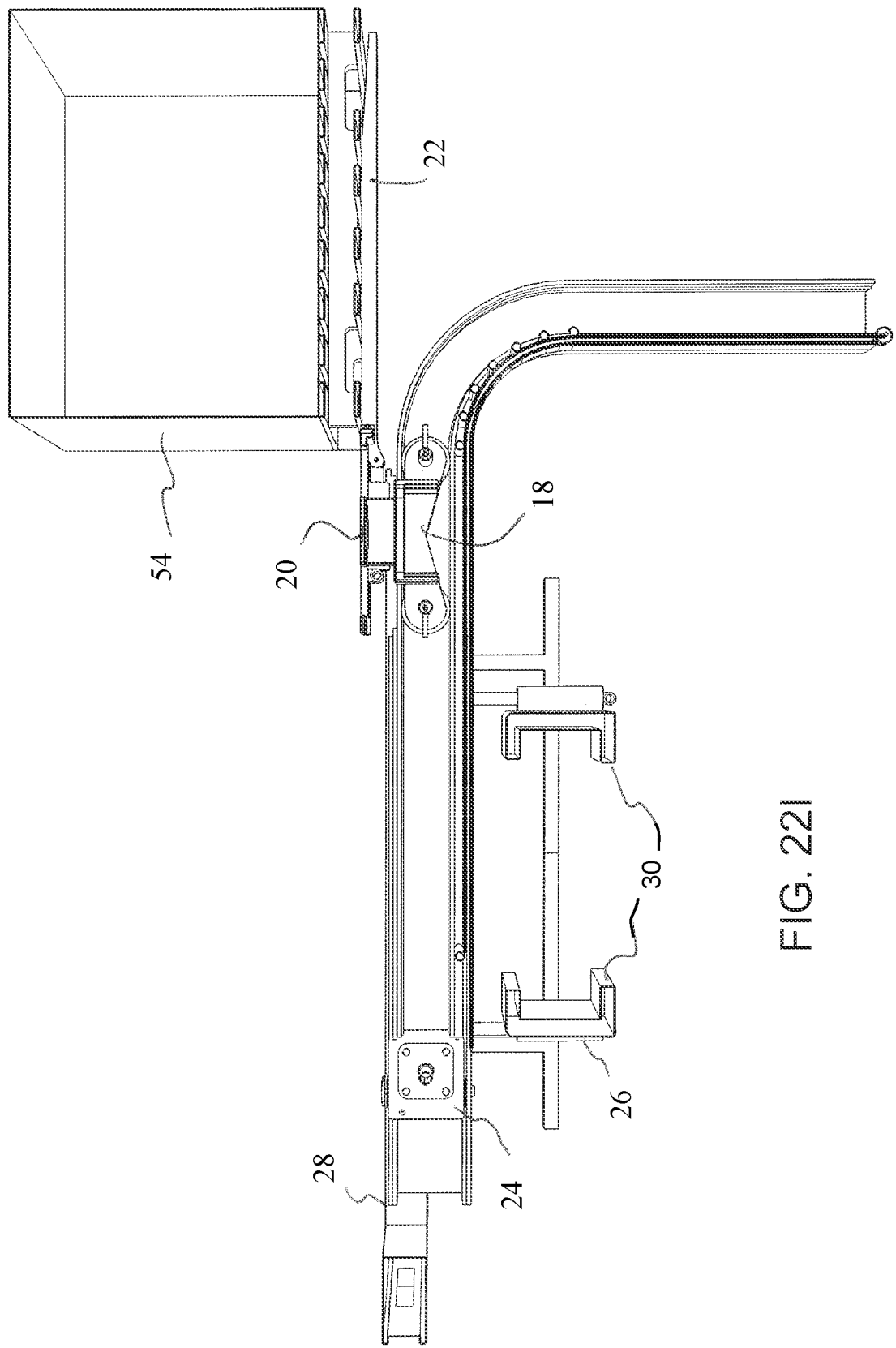

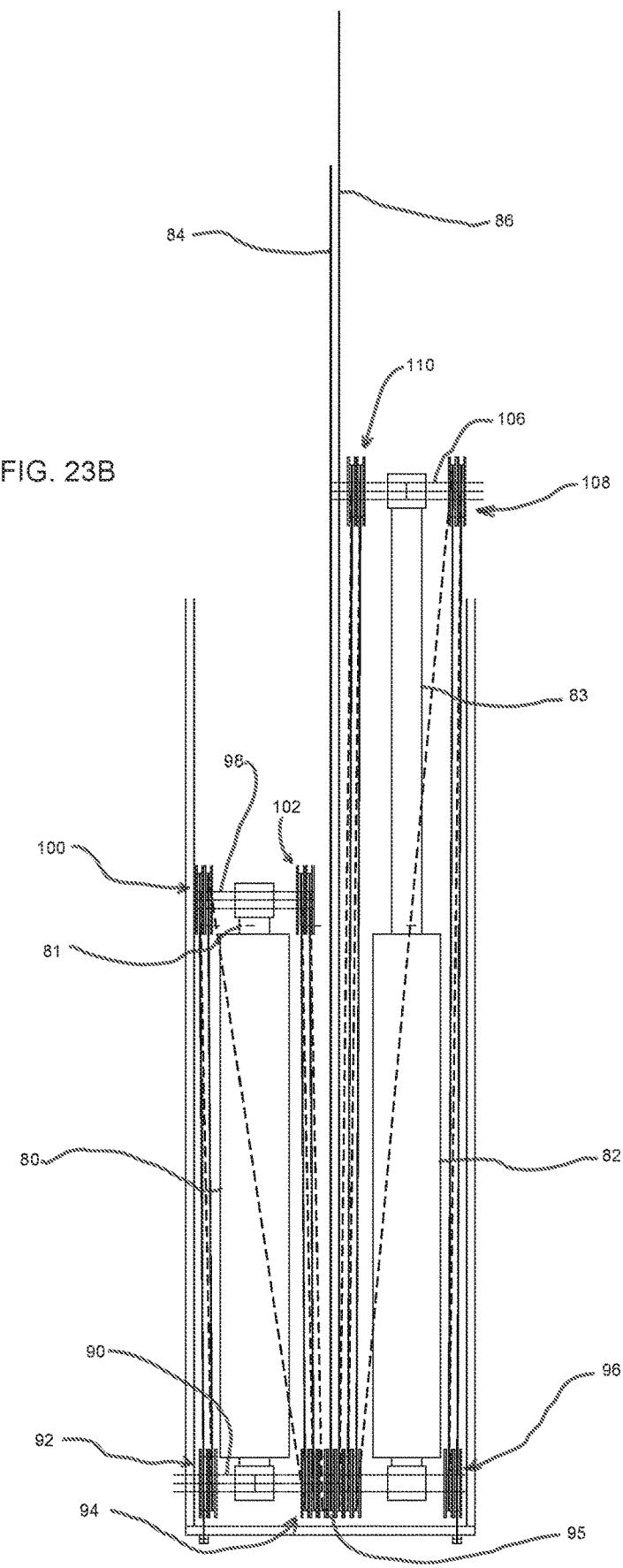

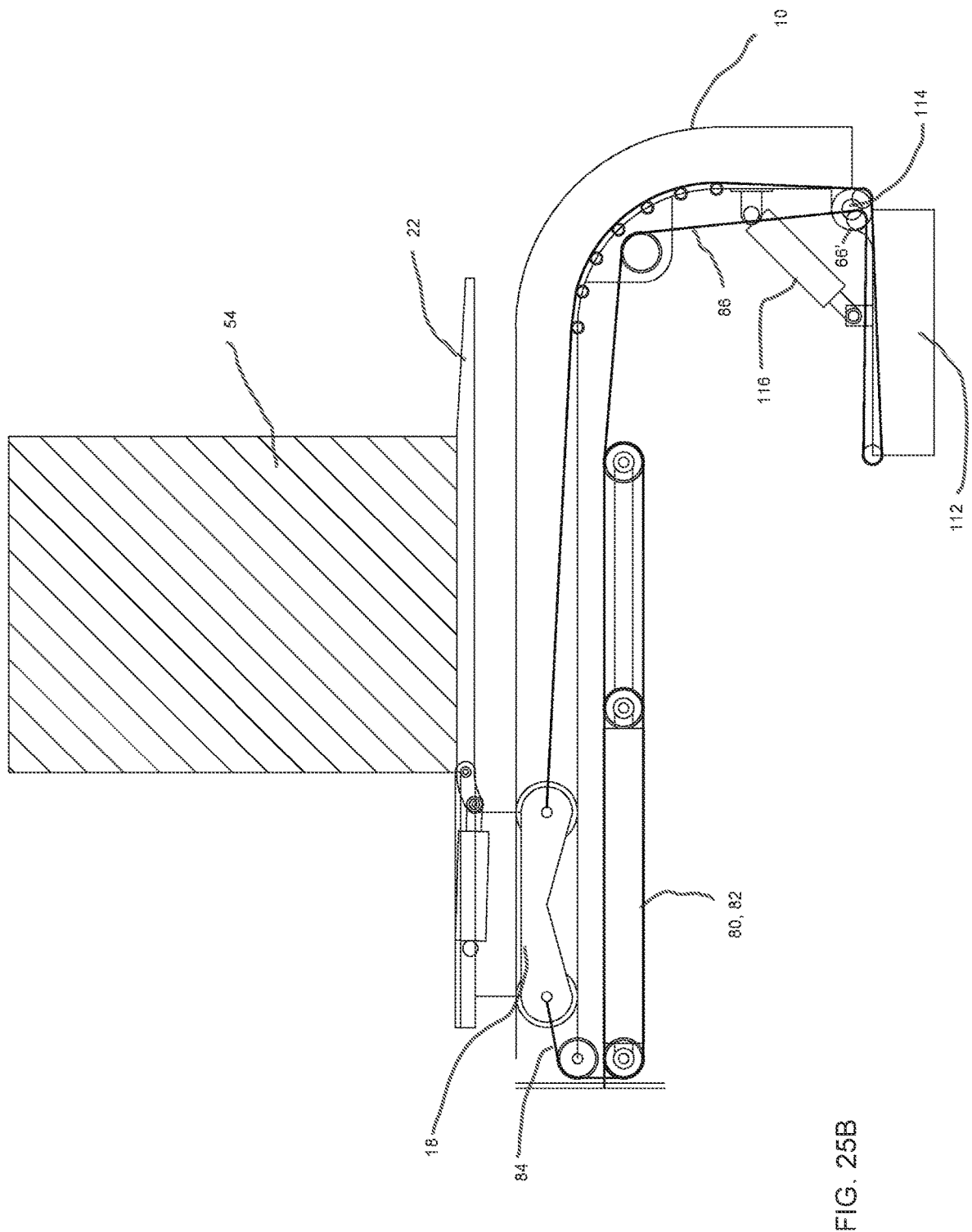

LOADING/UNLOADING DEVICE FOR A DELIVERY VEHICLE

FIELD OF THE INVENTION

The present disclosure relates to an electric/hydraulic loading/unloading device which facilitates unloading of items, objects or other material to be delivered by a delivery vehicle or apparatus and is also useful in facilitating loading of items, objects or some desired material onto the delivery vehicle or apparatus for transport to another location for distribution.

BACKGROUND OF THE INVENTION

For larger delivery vehicles, such as a tractor-trailer or a flatbed vehicle, for example, a common practice is to support or carry a small fork truck at the rear portion of the trailer or the flat bed vehicle. When the tractor-trailer or the flat bed vehicle arrives at a desired delivery location, the transported small fork truck is then lowered onto the ground and can be operated, by the operator of the tractor-trailer or the flatbed vehicle, to unload a desired portion of the shipment and deliver the same to the delivery location. After this occurs, the fork truck is then reloaded and secured onto the rear portion of the trailer or the flatbed vehicle, in a conventional manner, so that the tractor-trailer or the flatbed vehicle can then be transported to the next delivery location to make another delivery. This process is repeated numerous times during the course of the day until the entire contents, supported by the tractor-trailer or the flatbed vehicle, are delivered to all of the designated delivery locations.

Another common practice is to attach a small crane, or some other loading/unloading device, to the delivery vehicle. The operator can then utilize the crane or other loading/unloading device to facilitate both loading the delivery vehicle and unloading of a desired portion of the delivery shipment at each delivery location.

The drawbacks associated with both of the above techniques of loading and unloading delivery vehicles is that the structural integrity and overall size of the delivery vehicle must be increased in order to facilitate transportation of either the fork truck, the crane or some other loading/unloading device. In addition, smaller delivery vehicles, such as flatbeds and the like, which are often utilized to deliver materials such as lumber, appliances, foods/beverages, metal/steel, etc., cannot readily be equipped with a fork truck, a crane or some other suitable loading/unloading device.

SUMMARY OF THE INVENTION

Wherefore, it is an object of the present disclosure to overcome the above-mentioned shortcomings and drawbacks associated with the prior art delivery trucks and/or vehicles and facilitate either loading and unloading, by an operator, of a delivery shipment off the delivery vehicle at a desired delivery location.

Another object of the present disclosure is to provide a combined electric/hydraulic loading/unloading device which can readily and easily be installed on either new or existing delivery vehicles to assist the operator with easily loading and unloading of the desired delivery shipment, from the delivery vehicle, at each desired delivery location.

A further object of the present disclosure is to provide an electric/hydraulic loading/unloading device which has a range of motion in at least two degrees of freedom of motion, more preferably has a range of motion in at least three degrees of freedom of motion.

Yet another object of the present disclosure is to provide an electric/hydraulic loading/unloading device which can be driven by either hydraulic or pneumatic fluid generated by at least one electric motor to facilitate easy manipulation of the electric/hydraulic loading/unloading device by the operator.

Still another object of the present disclosure is to equip the delivery vehicle with at least one or possibly two or more outriggers so as to provide the delivery vehicle a larger and more stable footprint and thereby assist with safe loading and unloading the items to be delivered from the delivery vehicle.

The present disclosure relates to a loading/unloading device for delivering an item(s) to be delivered, the loading/unloading device comprising: an outer nested track; an inner nested track being nested within the outer nested track; a curved generally U-shaped guide track being nested within the inner nested track; a movable trolley being accommodated and movable along the curved generally U-shaped guide track; and a drive motor being supported by a first end of the curved generally U-shaped guide track for conveying the movable trolley back and forth along the curved generally U-shaped guide track for loading and unloading the item(s) to be delivered.

The present disclosure relates to a delivery vehicle comprising at least one loading/unloading device for delivering an item(s) to be delivered, the delivery vehicle comprising a vehicle frame and a vehicle bed, and the at least one loading/unloading device comprising: an outer nested track; an inner nested track being nested within the outer nested track; a curved generally U-shaped guide track being nested within the inner nested track; a movable trolley being accommodated and movable along the curved generally U-shaped guide track, the movable trolley supporting a fork platform and the fork platform supports at least one pivotable fork to facilitate loading and unloading the item(s) to be delivered; a drive motor being supported by a first end of the curved generally U-shaped guide track for conveying the movable trolley back and forth along the curved generally U-shaped guide track to facilitate loading and unloading the item(s) to be delivered on to or off of the vehicle bed of the delivery vehicle; and at least first and second lifting members are provided for raising and lowering the outer nested track, the inner nested track, the curved generally U-shaped guide track and the movable trolley relative to the vehicle bed of the delivery vehicle.

The present disclosure also relates to a method forming a delivery vehicle having at least one loading/unloading device for delivering an item(s) to be delivered, and the delivery vehicle comprising a vehicle frame and a vehicle bed, and the method comprising: providing an outer nested track; nesting an inner nested track within the outer nested track; nesting a curved generally U-shaped guide track within the inner nested track; accommodating a movable trolley within and along the curved generally U-shaped guide track, the movable trolley supporting a fork platform and the fork platform supports at least one pivotable fork to facilitate loading and unloading the item(s) to be delivered; supporting a drive motor at a first end of the curved generally U-shaped guide track for conveying the movable trolley back and forth along the curved generally U-shaped guide track to facilitate loading and unloading the item(s) to be delivered on to or off of the vehicle bed of the delivery vehicle; and providing at least first and second lifting members for raising and lowering the outer nested track, the inner nested track, the curved generally U-shaped guide track and the movable trolley relative to the vehicle bed of the delivery vehicle.

BRIEF DESCRIPTION OF THE DRAWINGS

The accompanying drawings, which are incorporated in and constitute a part of the specification, illustrate various embodiments of the disclosure and together with the general description of the disclosure given above and the detailed description of the drawings given below, serve to explain the principles of the invention. The invention will now be described, by way of example, with reference to the accompanying drawings in which:

FIG. 10 is a diagrammatic partial perspective view of the first end of the electric/hydraulic loading/unloading device of FIG. 2 showing the first nested track cylinder for moving the curved generally U-shaped guide track relative to the outer nested track 6;

FIG. 22A is a diagrammatically cross sectional view showing the item(s) to be delivered resting on the vehicle bed with the electric/hydraulic loading/unloading device located within a loading/unloading recess and out of engagement with the item(s) to be delivered;

FIG. 22I is a diagrammatically cross sectional view showing movement of the inner nested track, the curved generally U-shaped guide track, the movable trolley, and the item(s) to be delivered relative to the outer nested track;

FIG. 23B is a diagrammatic bottom plan view showing the second embodiment with the second cable hydraulic cylinder shown in its maximum extended position and the first cable hydraulic cylinder shown in its minimal retracted position so that the trolley is positioned closely adjacent the second end of the curved generally U-shaped guide track;

FIG. 25B is a diagrammatically cross sectional view, following full actuation of the guide track cylinder, in which the lower most second end of the second section of the curved generally U-shaped guide track is moved, relative to a remainder of the curved generally U-shaped guide track, into its stowed position.

It should be understood that the drawings are not necessarily to scale and that the disclosed embodiments are sometimes illustrated diagrammatically and as partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present disclosure will be understood by reference to the following detailed description, which should be read in conjunction with the appended drawings. It is to be appreciated that the following detailed description of various embodiments is by way of example only and is not meant to limit, in any way, the scope of the present disclosure.

Turning now to FIGS. 1-9, a brief discussion concerning the various components of a first embodiment of the present disclosure will now be discussed. This brief discussion will then be followed by detail discussions concerning the various components as well as variations thereof according to the disclosure.

Figure 1:
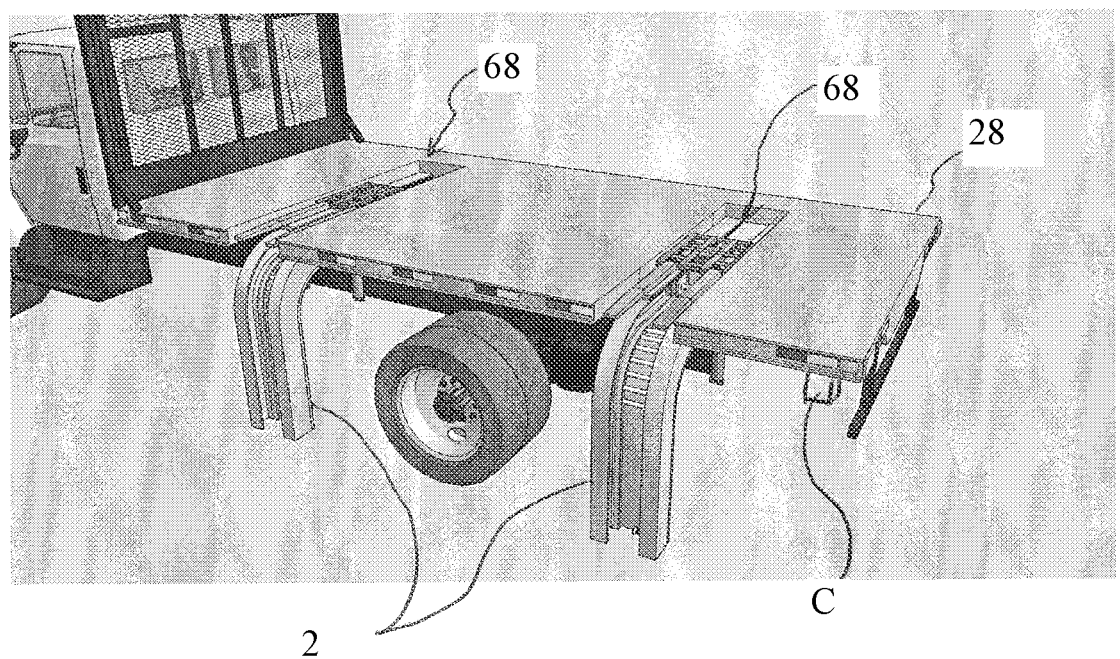
FIG. 1 is a diagrammatic perspective view of an electric/hydraulic loading/unloading device, according to the disclosure, shown installed on a delivery vehicle for loading/unloading from the left (driver) side of the vehicle.
Figure 17:
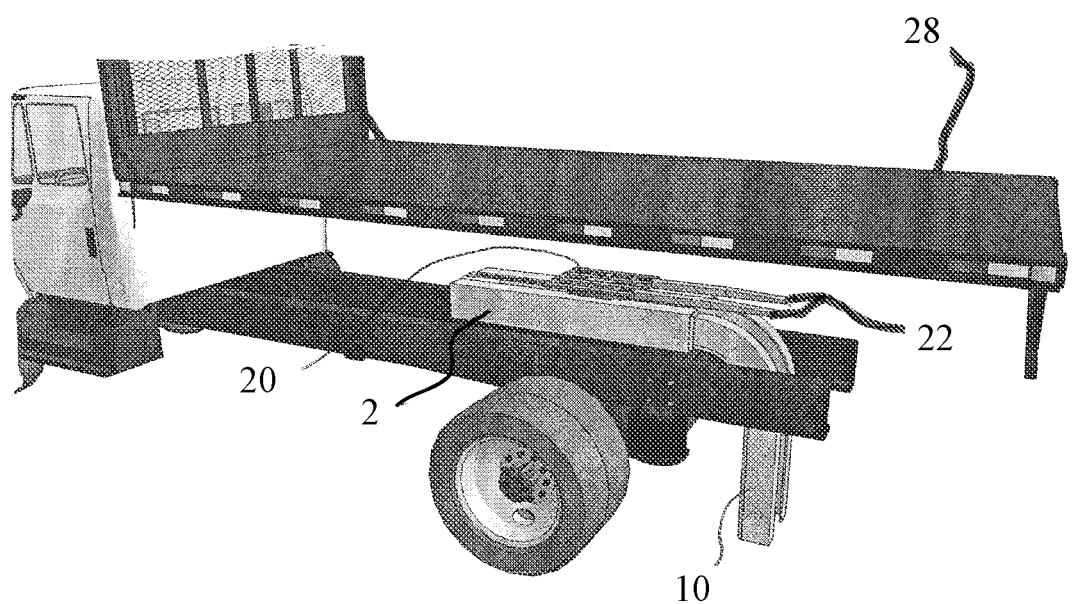
FIG. 17 is a diagrammatic perspective view of an electric/hydraulic loading/unloading device, according to the disclosure, shown installed at the rear of a delivery vehicle for loading/unloading item(s) to be delivered from the rear of the delivery vehicle.

As can be seen in these figures, the electric/hydraulic loading/unloading device 2 generally comprises at least one and typically two or more electric/hydraulic loading/unloading devices 2 which are typically arranged spaced apart and parallel to one another, once each of the electric/hydraulic loading/unloading devices 2 is installed on a delivery vehicle 4 (see FIGS. 1 and 17, for example). It is to be appreciated that when delivering relatively long items, e.g., 16 foot long pieces of lumber, 20 foot pieces of steel, etc., possibly three, four or more electric/hydraulic loading/unloading devices 2 may be spaced apart from one another along one side of the trailer or the flatbed of the delivery vehicle 4 by a distance of 6±2 feet or so. The plurality of electric/hydraulic loading/unloading devices 2 typically all work in unison with one another to support and load/unload such relatively long items to be delivered from the trailer or the flatbed of the delivery vehicle 4, as will be discussed below in further detail.

Each electric/hydraulic loading/unloading device 2 comprises an outer nested track 6, an inner nested track 8 and a curved generally U-shaped guide track 10. The a first end of the inner nested track 8 is movable nested within the outer nested track 6, and a first end of the curved generally U-shaped guide track 10 is movably nested within the inner nested track 8.

The curved generally U-shaped guide track 10 comprises a substantially straight first section 12 located at the first end thereof, a substantially straight second section 14 located at an opposed second end thereof, and a curved section 16 located between and interconnecting the first and the second sections 12, 14 with one another. A movable trolley 18 is accommodated within and guidable along the curved generally U-shaped guide track 10, while a fork platform 20 supports at least one fork 22, and more typically a pair of parallel and spaced apart forks 22 are supported by the movable trolley 18.

Figure 15:
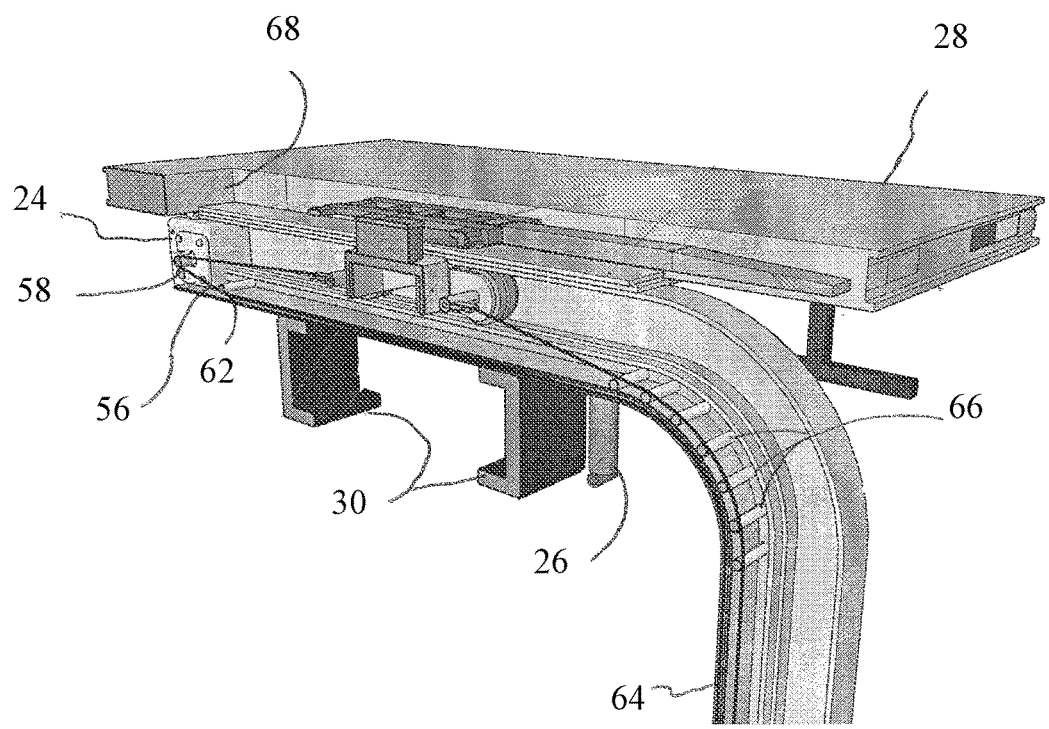
FIG. 15 is a diagrammatic perspective view of the electric/hydraulic loading/unloading device of FIG. 2, following installation on a vehicle bed of a delivery vehicle for loading/unloading item(s) to be delivered.

A drive motor 24 (see FIG. 15 for example) is supported by the delivery vehicle 4, typically fixedly attached to a first end of the outer nested track 6 for conveying the movable trolley 18 back and forth along and within the curved generally U-shaped guide track 10. Typically, first and second spaced apart lifting members 26 (only one of which is shown in FIG. 15), e.g., at least two and possibly four or more track hydraulic cylinders, are provided for raising and lowering, e.g., pivoting or tilting, the outer nested track 6, and thus the inner nested track 8, the curved generally U-shaped guide track 10, the fork platform 20 and the at least one fork 22, relative to the vehicle bed 28 supported by the delivery vehicle 4, the purpose of such pivoting or tilting motion of the outer nested track 6, the inner nested track 8 and the curved generally U-shaped guide track 10, relative to the vehicle bed 28, will become apparent from the following description. A further description concerning each of these components will now be provided below.

Figure 2:
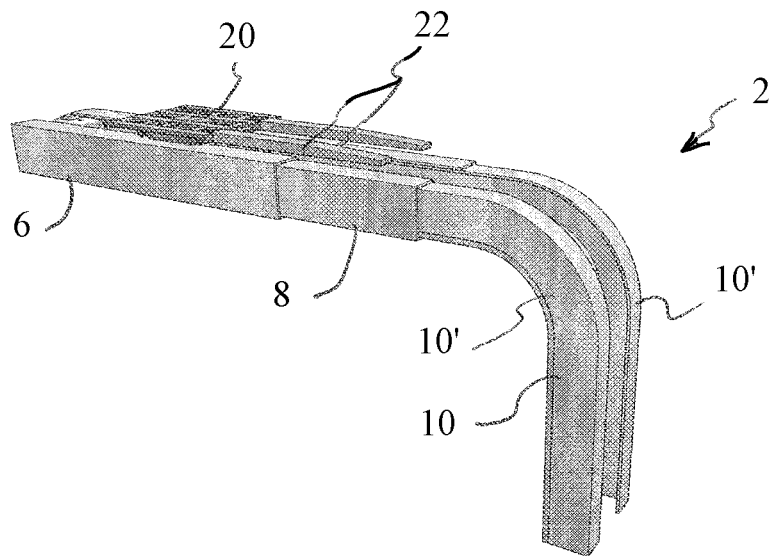
FIG. 2 is a diagrammatic perspective view of the electric/hydraulic loading/unloading device, according to the disclosure.
Figure 3:
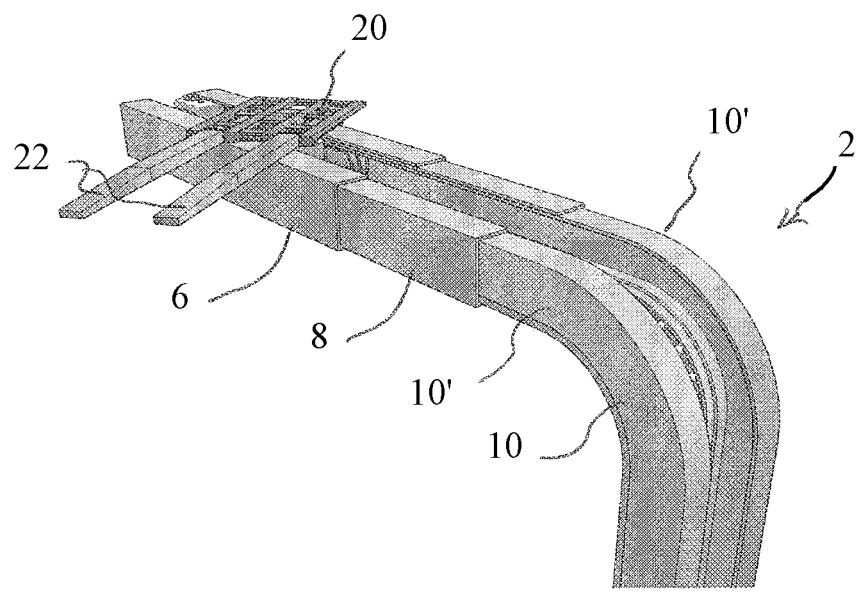
FIG. 3 is a diagrammatic perspective view of the electric/hydraulic loading/unloading device of FIG. 2, with the fork platform shown rotated with respect to the movable trolley.
Figure 4:
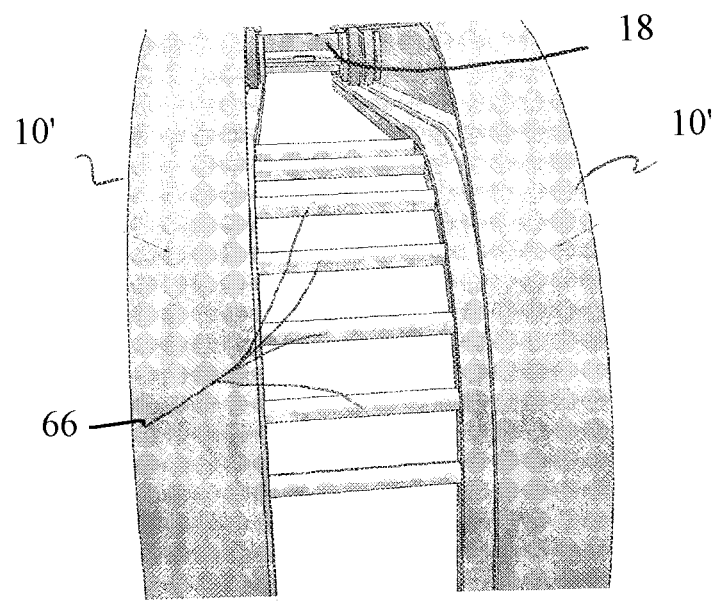
FIG. 4 is a diagrammatic front elevational view of the curved generally U-shaped guide track, according to the disclosure.

Turning now to FIGS. 2 and 4 for example, it can be seen that the outer nested track 6 supports the inner nested track 8 and the inner nested track 8, in turn, supports a first end of the curved generally U-shaped guide track 10. The curved generally U-shaped guide track 10 comprises two track members 10' which are substantially mirror images of one another. A plurality of cross members (not separately numbered) permanently connect the two track members 10' to one another. The inner nested member 8 is movable relative to the outer nested track 6 while the curved generally U-shaped guide track 10 is movable relative to the inner nested track 8 as discussed below in further detail. Opposed ends of the outer nested track 6 are directly respectively supported by the vehicle frame 30 via at least spaced apart first and second lifting members 26, e.g., typically at least first and second track hydraulic cylinders.

The outer nested track 6 closely surrounds and closely accommodates at least the first end of the inner nested track 8. A plurality of needle bearings (not shown in detail) are located between the inwardly facing surface(s) of the outer nested track 6 and the outwardly facing surface(s) of the inner nested track 8, typically at least adjacent second end(s) thereof, to facilitate sliding movement of the inner nested track 8 relative to the outer nested track 6, i.e., generating relatively low friction during such relative sliding movement. The needle bearings may be supported by the inwardly facing surface of the outer nested track 6 or by the outwardly facing surface of the inner nested track 8, typically at least adjacent second end(s) thereof.

The inner nested track 8 closely surrounds and accommodates the straight first section 12 of the curved generally U-shaped guide track 10. Likewise, a plurality of needle bearings (not shown in detail) are located between the inwardly facing surface(s) of the inner nested track 8 and the outwardly facing surface(s) of the straight first section 12 of the curved generally U-shaped guide track 10, typically adjacent the second end of the inner nested track 8 and the first end of the curved generally U-shaped guide track 10, to facilitate sliding movement between the curved generally U-shaped guide track 10 and the inner nested track 8, i.e., generate relatively low friction during relative movement. The needle bearings may be supported by the inwardly facing surface of the inner nested track 8 or by the outwardly facing surface of the curved generally U-shaped guide track 10, typically adjacent the second and first ends, respectively, thereof.

As generally shown in FIG. 10, a first end of a cylinder housing of at least a first nested track cylinder 32 is typically connected to the outer nested track 6, at or adjacent the first end thereof, while a free piston end of the at least first nested track cylinder 32 is connected adjacent a first end of the curved generally U-shaped guide track 10. The at least first nested track cylinder 32 facilitates sliding movement of the curved generally U-shaped guide track 10 relative to the outer nested track 6, the purpose of which will become apparent from the following description. If desired or required depending upon weight of the load to be unloaded/loaded, a first end of a cylinder housing of a second nested track cylinder (not shown) may be connected to the outer nested track 6, at or adjacent the first end thereof, while a free end of the piston of the second nested track cylinder is connected adjacent a first end of the curved generally U-shaped guide track 10. The first and second nested track cylinders 32 are controlled to move in unison with one another.

Due to such arrangement, when hydraulic fluid is supplied to a first end of the at least one nested track cylinder(s) 32, an overall length of the at least one nested track cylinder(s) 32 thereby increases which, in turn, moves the second end of the curved generally U-shaped guide track 10 away from the second end of the outer nested track 6 so as to increase a combined axial length of the outer and the inner nested tracks 6, 8 and the curved generally U-shaped guide track 10. It is noted that such relative movement of the curved generally U-shaped guide track 10, with respect to the outer nested track 6, also causes the intermediate inner nested track 8 to move correspondingly as well. Alternatively, when hydraulic fluid is supplied to a second end of the at least one nested track cylinder(s) 32, the overall length of the at least one nested track cylinder(s) 32 thereby decreases which, in turn, retracts and pulls the second end of the curved generally U-shaped guide track 10 back toward the second end of the outer nested track 6 so as to decrease the combined overall axial length of the outer and the inner nested tracks 6, 8 and the curved generally U-shaped guide track 10. Although not shown in detail, a first stop is provided for preventing first end of the inner nested track 8 from becoming inadvertently separated/disconnected from the second end of the outer nested track 6 while a second stop is provided for preventing first end of the curved generally U-shaped guide track 10 from becoming inadvertently separated/disconnected from the second end of the inner nested track 8.

As briefly discussed above, at least one pair of spaced apart lifting members 26, e.g., first and second track hydraulic cylinders, are provided for raising and lowering the outer nested track 6, as well as the inner nested track 8, the curved generally U-shaped guide track 10, the trolley 18, the fork platform 20 and the fork(s) 22, and the item(s) to be delivered 54 relative to a vehicle frame 30 and the vehicle bed 28. In particular, the first lifting member 26, e.g., a first track hydraulic cylinder, is located and secured between a surface or a first portion of the vehicle frame or body 30 and a first end of the outer nested track 6 while the second lifting member 26 (not shown in detail), e.g., a second track hydraulic cylinder, is located and secured between the surface or a second portion of the vehicle frame or body 30 and a second end of the outer nest track 6.

While only first and second lifting members 26 are shown in this Figure, it is to be appreciated that additional lifting members 26 may be utilized, depending upon the weight of the particular load to be lifted and delivered at a delivery location, without departing from the spirit and scope of the present disclosure. It is to be appreciated that the first and second (as well as any additional) lifting members 26 can be operated either independently of one another or simultaneously with one another, as will be discussed below in the following description.

Figure 11:
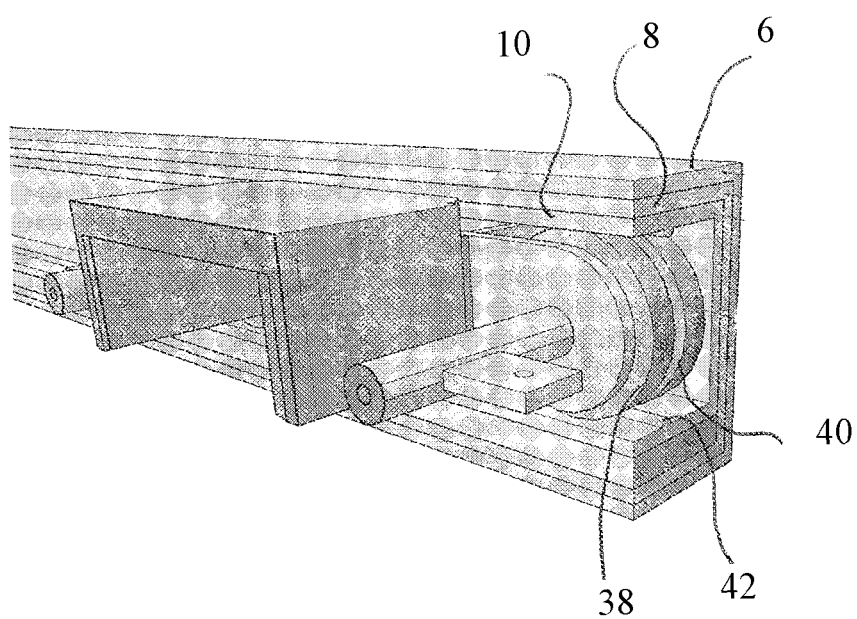
FIG. 11 is a diagrammatic perspective view of the first end of the curved generally U-shaped guide track and the movable trolley, with the fork platform, the outer nested track and the inner nested track removed for reasons of clarity.
Figure 5:
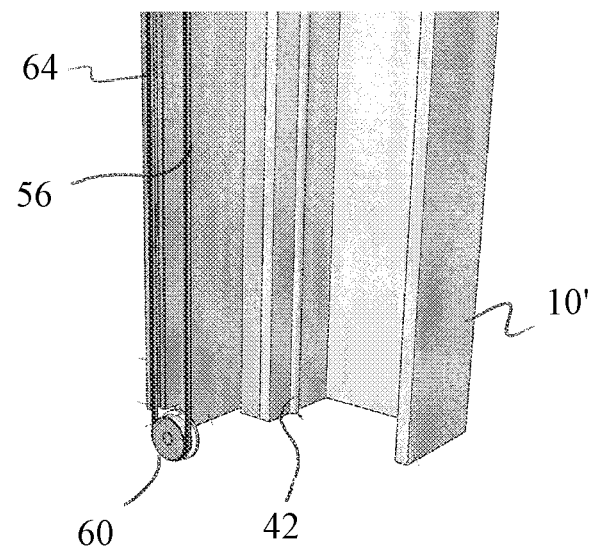
FIG. 5 is a diagrammatic perspective view showing a return sprocket located at a second end of the curved generally U-shaped guide track, according to the disclosure.
Figure 9:
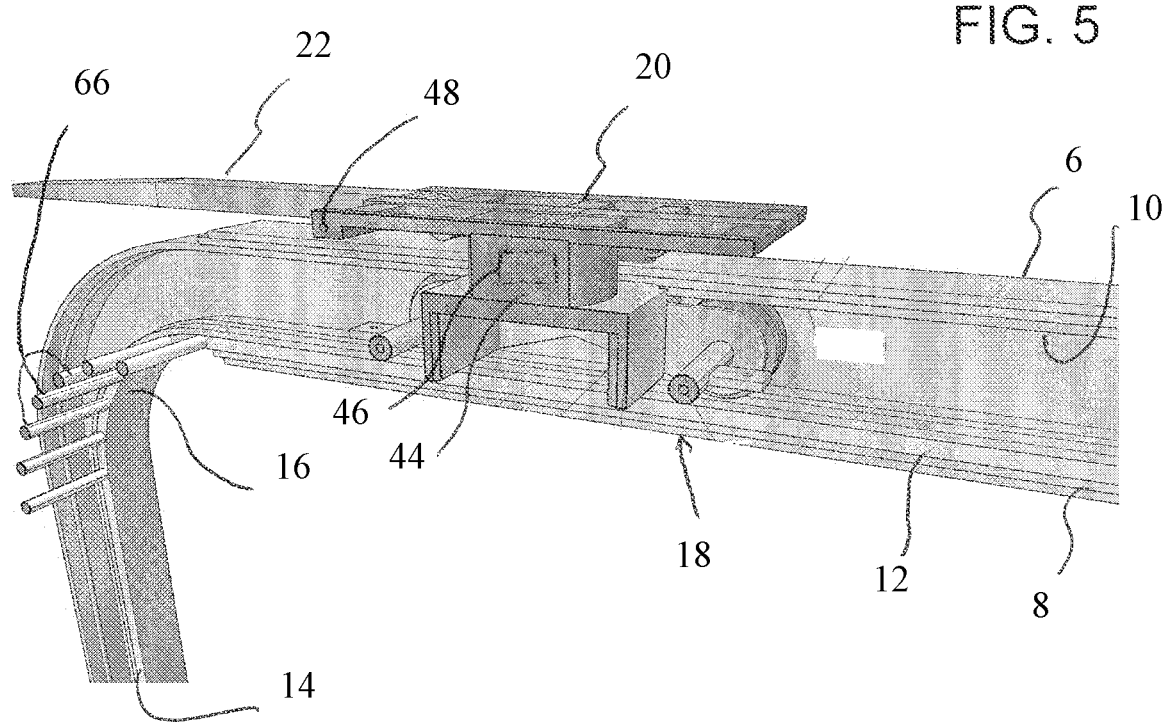
FIG. 9 is a diagrammatic perspective view of the right side of the electric/hydraulic loading/unloading device of FIG. 2, with the fork platform shown aligned with the movable trolley.
Figure 7:
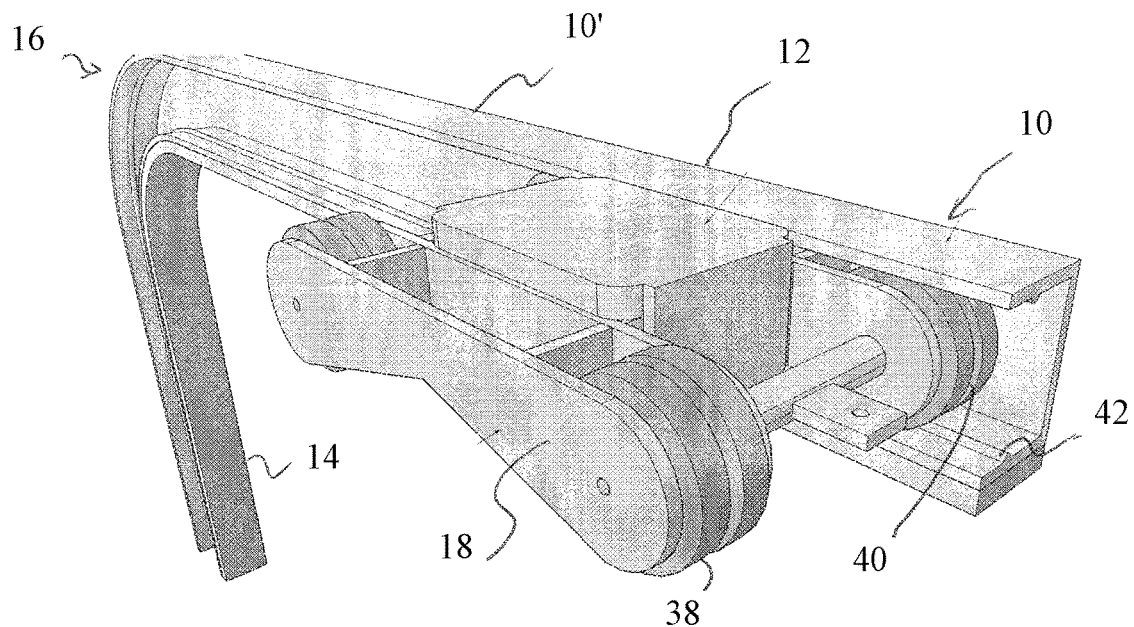
FIG. 7 is a diagrammatic perspective view of the right side of the first end of the electric/hydraulic loading/unloading device of FIG. 2 showing the movable trolley prior to installation of the fork platform.
Figure 6:
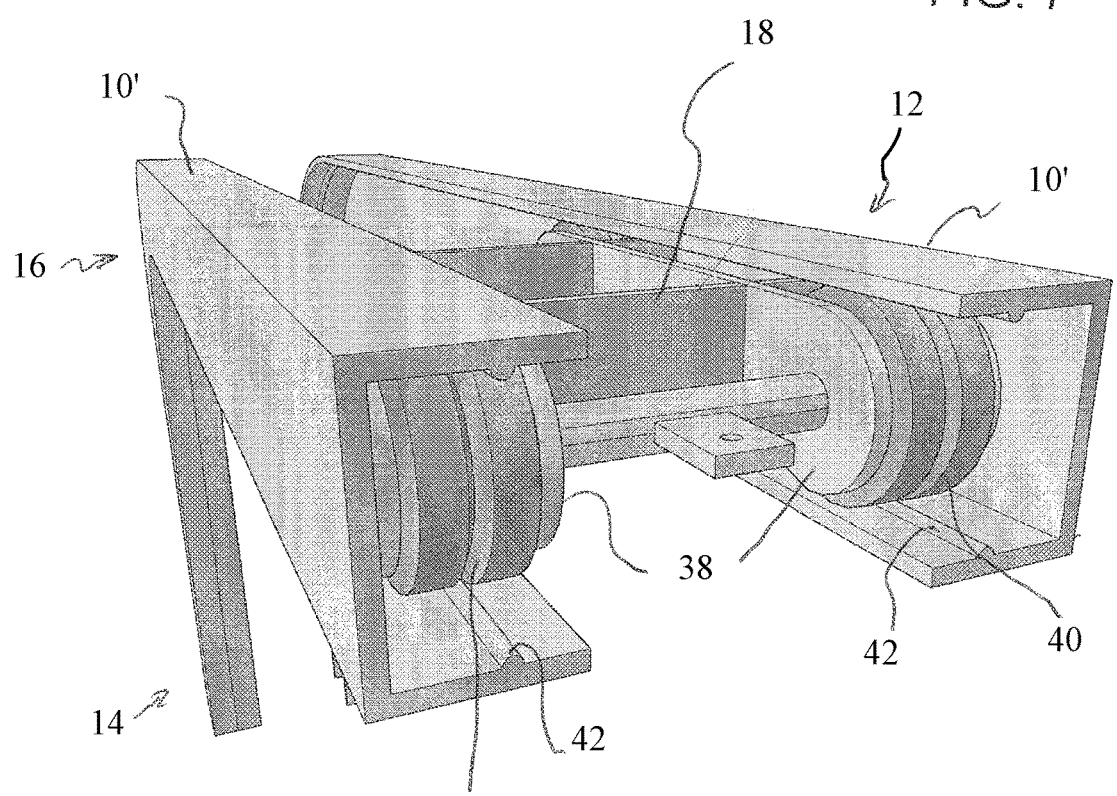
FIG. 6 is a diagrammatic end view of the first end of the curved generally U-shaped guide track of FIG. 2, prior to installation of the fork platform, the outer nested track, and the inner nested track.
Figure 16:
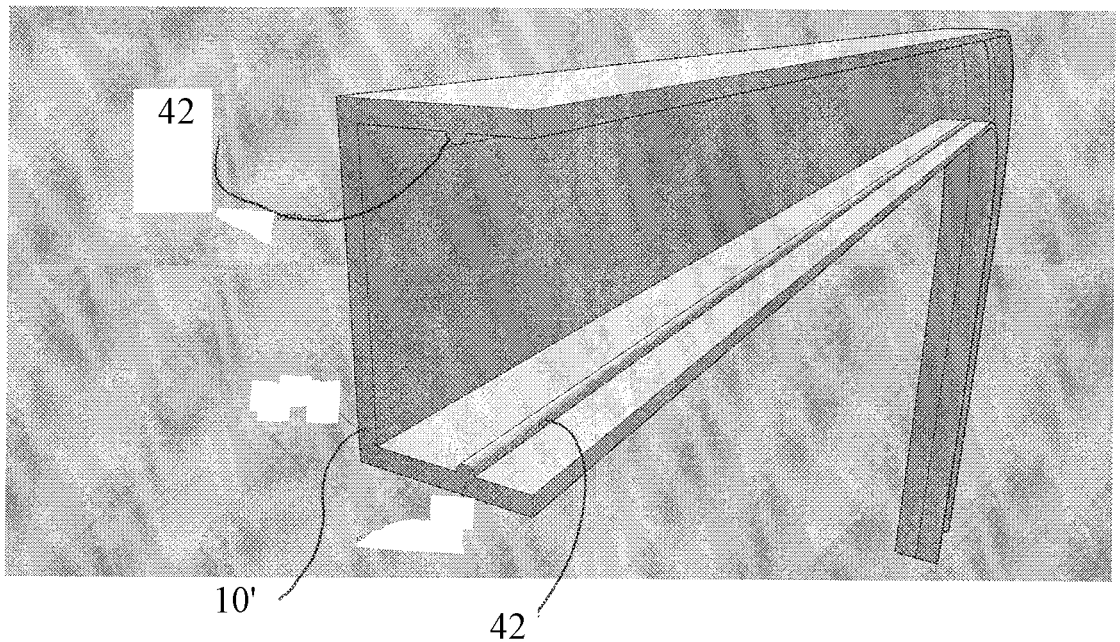
FIG. 16 is a diagrammatic left side elevational view of a guide member or rail supported or formed on both upwardly and downwardly facing surfaces of the left side track member of the curved generally U-shaped guide track.

Turning now to FIGS. 6, 7, 9, 11 and 12, a detailed description concerning the movable trolley 18 will now be provided. As shown in these figures, the movable trolley 18 generally comprises a shuttle base frame 36 which supports spaced apart first and second pairs of rotatable wheels 38. Each pair of rotatable wheels 38 is supported by a respective axle which facilitates rotation of the respective rotatable wheels 38 relative to the shuttle base frame 36 of the movable trolley 18. As shown in FIGS. 6 and 11, for example, each one of the wheels 38 has an (centrally located) annular recess 40 formed within an outer periphery thereof which is sized and shape to matingly engage with a mating guide member or rail 42 supported or formed on either, or both, an upwardly facing or a downwardly facing surface of both of the track members 10' of the curved generally U-shaped guide track 10 (see FIG. 16). Engagement between the annular recesses 40 of the wheels 38 with the mating guide member or rail 42 of the guide track 10 facilitates guided travel of the movable trolley 18 within and along the curved generally U-shaped guide track 10.

A base connection member 44 is permanently supported by a top, upwardly facing surface of the shuttle base frame 36. Typically, either an electric or a hydraulic platform motor 46 (only diagrammatically shown in FIG. 9) is supported by the base connection member 44 of the shuttle base frame 36 and couples or connects the fork platform 20 to the shuttle base frame 36. When the electric or the hydraulic platform motor 46 is operated in a first rotational direction, both the fork platform 20 and the supported fork(s) 22 are rotated in a first rotational direction, e.g., clockwise, relative to the shuttle base frame 36. When the electric or the hydraulic platform motor 46 is operated in a second rotational direction, both the fork platform 20 and the supported fork(s) 22 are rotated in a second rotational direction, e.g., counter clockwise, relative to the shuttle base frame 36. Typically, the electric or the hydraulic platform motor 46 can rotate the fork platform 20 at least 180 degrees with respect to the shuttle base frame 36 and may possibly rotate the fork platform 20 360 degrees with respect to the shuttle base frame 36.

Figure 14:
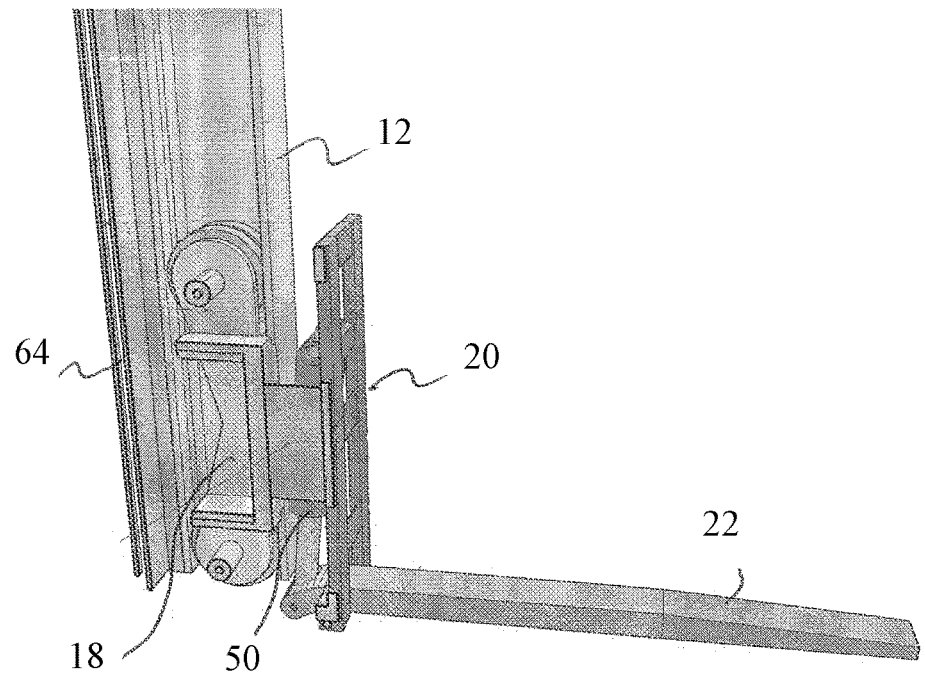
FIG. 14 is a diagrammatic perspective view of the left side of the electric/hydraulic loading/unloading device of FIG. 2, with the fork platform shown aligned with the movable trolley and located at the second end of the curved generally U-shaped guide track with the fork substantially normal to the fork platform.

As stated above, at least one extendible fork 22, and more preferably first and second extendible forks 22, is/are pivotably connected adjacent a second end of the fork platform 20, e.g., via a pivot shaft or rod 48. A separate platform hydraulic cylinder 50 is provided for controlling pivoting motion of each fork 22 relative to the fork platform 20. As shown, a first end of the platform hydraulic cylinder 50 is typically connected to an undersurface of the fork platform 20, adjacent a first end thereof, while a free end of the cylinder rod of the platform hydraulic cylinder 50 is connected to a shorter first end of the fork 22, located closely adjacent the pivot shaft or rod 48. When the platform hydraulic cylinder 50 is supplied with hydraulic fluid so that the overall length of the platform hydraulic cylinder 50 is increased (the platform hydraulic cylinder 50 is moved to its extended position), each fork 22 is arranged generally perpendicular to the fork platform 20 (see FIG. 14 for example) while when the platform hydraulic cylinder 50 is supplied with hydraulic fluid so that the overall length of the platform hydraulic cylinder 50 is decreased (the platform hydraulic cylinder 50 is moved to its retracted position), each fork 22 is arranged generally parallel to the fork platform 20 (see FIGS. 2 and 8 for example). The purpose of such pivoting movement of the fork(s) 22, relative to the fork platform 20, will become apparent from the following description.

In addition, a fork hydraulic cylinder (not shown) may be provided for controlling an overall axial length of each fork 22. A first end of the fork hydraulic cylinder would be typically connected to the fork platform 20, at the pivot shaft or rod 48 connection between the fork 22 and the fork platform 20, while a free end of the cylinder rod would be connected adjacent a free end of the extendible fork 22. When the fork hydraulic cylinder is supplied with hydraulic fluid so that an overall length of the fork hydraulic cylinder is increased, (the fork hydraulic cylinder is moved to its extended position), the fork 22 is extended to its maximum length for supporting an item(s) to be delivered 54. When the fork hydraulic cylinder is supplied with hydraulic fluid so that the overall length of the fork hydraulic cylinder is decreased, (the fork hydraulic cylinder is moved to its retracted position), the fork 22 is retracted into its shortest overall axial length for supporting an item(s) to be delivered 54.

Figure 8:
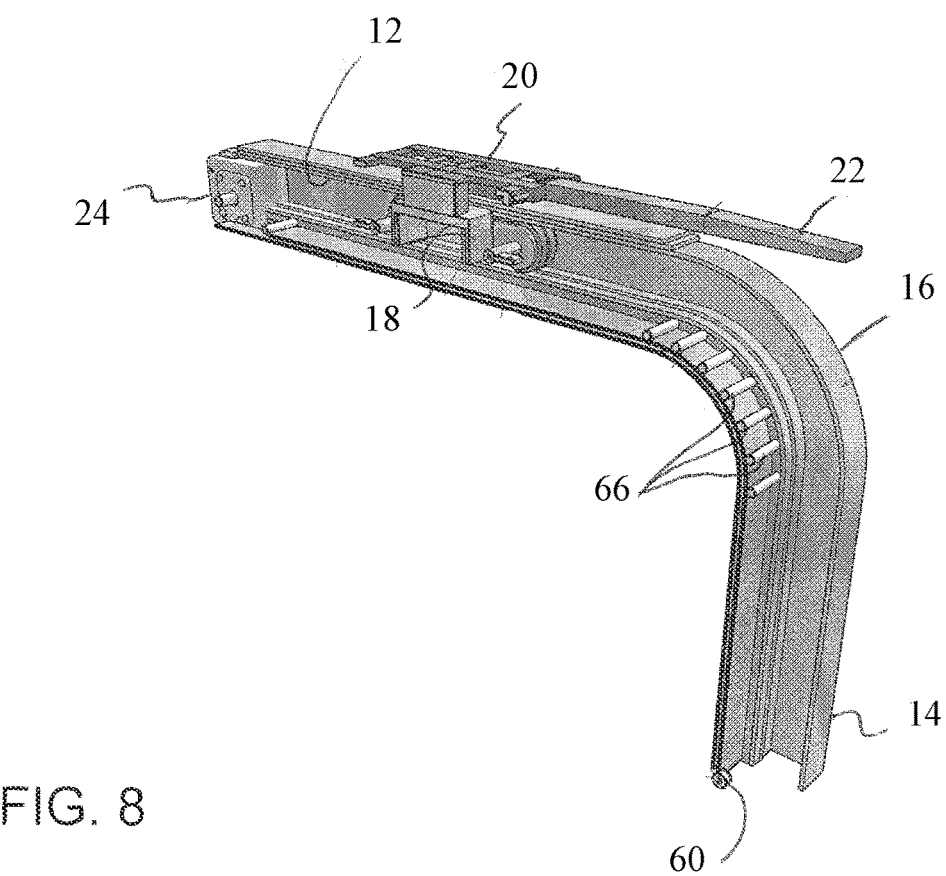
FIG. 8 is a diagrammatic perspective view of the left side of the electric/hydraulic loading/unloading device of FIG. 2, with the fork platform shown aligned with the movable trolley.
Figure 12:
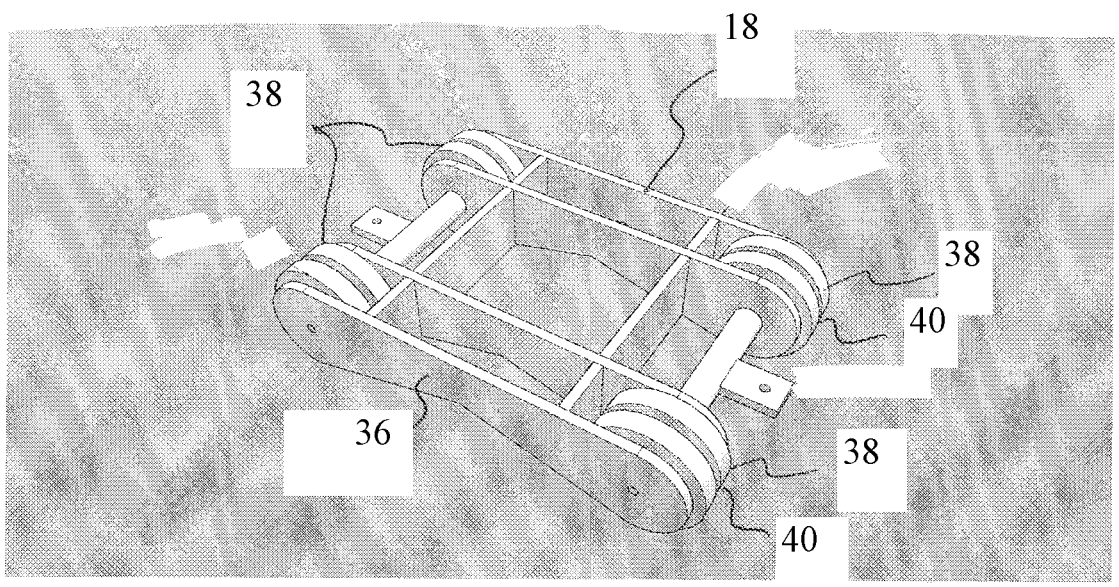
FIG. 12 is a diagrammatic perspective view of the movable trolley with the base connection member and the fork platform removed for reasons of clarity.

As briefly discussed above, a drive motor 24 facilitates to and fro movement of the movable trolley 18 along the inner curved generally U-shaped guide track 10 from adjacent the first end to adjacent the second end thereof. As generally shown in FIGS. 8 and 15, the drive motor 24 is fixed located adjacent the first end of the outer nested track 6. A first end of a chain, wire or some other conventional drive member 56, is fixed connected to a first end of the shuttle base frame 36 of the movable trolley 18, in a conventional manner (e.g., by a nut and bolt, for example), while a second end of the chain, wire or some other conventional drive member 56 is connected to an opposite second end of the shuttle base frame 36 of the movable trolley 18, in a conventional manner (e.g., by a nut and bolt, for example).

A first intermediate section of the chain, wire or some other conventional drive member 56, wraps around and drivingly engages with a drive sprocket 58, supported by the drive motor 24, while a second section of the chain, wire or some other conventional drive member 56, wraps around and engages with a return sprocket 60, which is rotatable supported adjacent the second end of the curved generally U-shaped guide track 10. An idler sprocket 62 is located closely adjacent the drive sprocket 58 so as to direct the chain, wire or some other conventional drive member 56, into and along a track guide 64 formed along a lower portion of. The track guide 64 extends between the idler sprocket 62 and the return sprocket 60.

A plurality of rollers 66 are located and extend between opposed track members 10' along the curved section 16 of the curved generally U-shaped guide track 10. The plurality of rollers 66 support and guide the chain, wire or some other conventional drive member 56 so as to minimize the generation of friction as the chain, wire or some other conventional drive member 56 moves to and fro relative to the curved section 16 of the curved generally U-shaped guide track 10.

As a result of this arrangement, when the drive motor 24 rotates the drive sprocket 58 in a first rotational direction, e.g., counter clockwise, the chain, wire or some other conventional drive member 56, pulls on a first side of the movable trolley 18 so as to move the movable trolley 18 toward the drive motor 24 and the first end of the curved generally U-shaped guide track 10. Alternatively, when the drive motor 24 rotates the drive sprocket 58 in an opposite second rotational direction, e.g., clockwise, the chain, wire or some other conventional drive member 56, pulls on a second side of the movable trolley 18 so as to move the movable trolley 18 toward the second end of the curved generally U-shaped guide track 10. As noted above, the track guide 64 and the plurality of rollers 66 assist the chain, wire or some other conventional drive member 56, with moving to and fro along the curved generally U-shaped guide track 10 while avoiding the chain, wire or some other conventional drive member 56 from becoming bound, jammed or otherwise generating significant friction during operation. The drive motor 24 and the chain, wire or some other conventional drive member 56 together form a drive assembly for the trolley 18.

Figure 13:
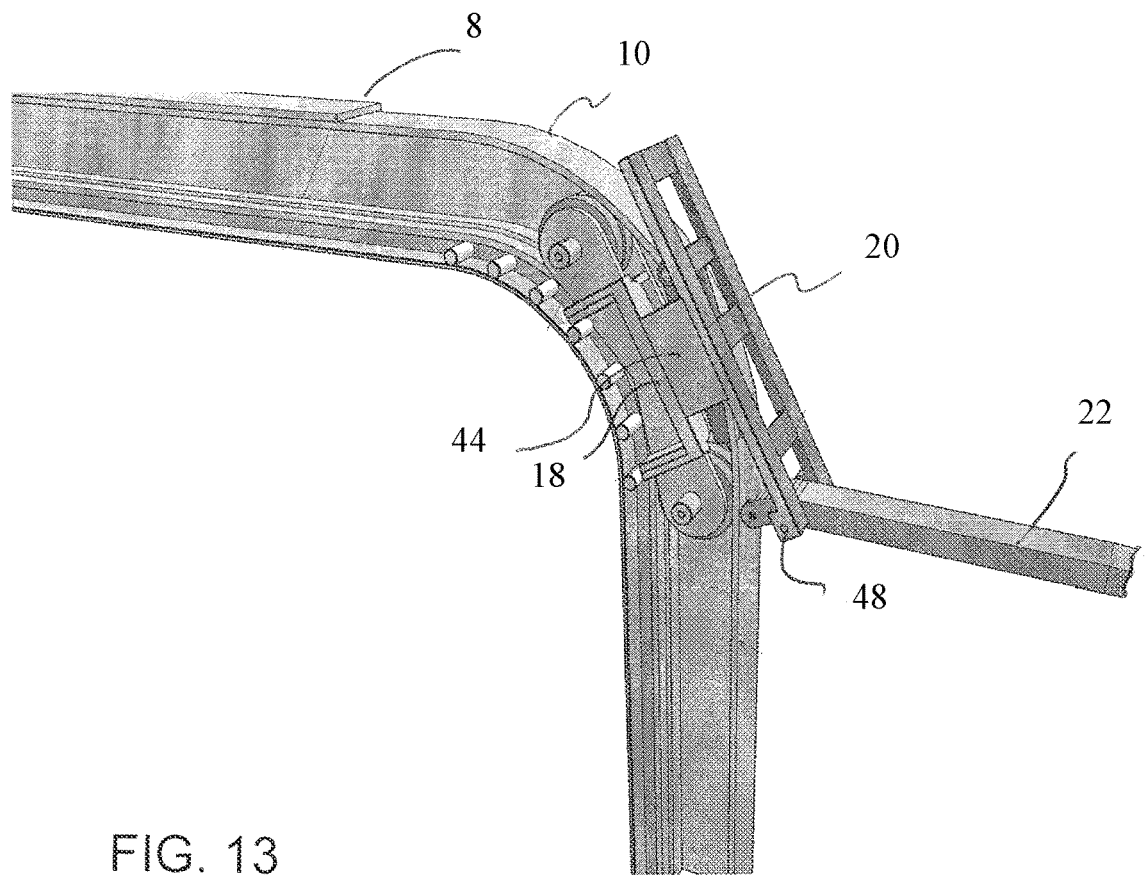
FIG. 13 is a diagrammatic perspective view of the left side of the electric/hydraulic loading/unloading device of FIG. 2, with the fork platform shown aligned with the movable trolley and located in the curved section of the curved generally U-shaped guide track.

As shown, when the movable trolley 18 is moved along the straight first section 12 of the curved generally U-shaped guide track 10, each fork 22 is typically arranged generally parallel to the fork platform 20 (see FIG. 2 for example). When the movable trolley 18 is moved along the straight second section 14 of the curved generally U-shaped guide track 10, each fork 22 is typically arranged generally perpendicular to the fork platform 20 (see FIG. 14 for example). However, when the movable trolley 18 is moved from the straight first section 12, along the curved section 16, to the straight second section 14 of the curved generally U-shaped guide track 10, each fork 22 is gradually moved from its parallel orientation, with respect to the fork platform 20, into its perpendicular orientation, with respect to the fork platform 20 (see FIG. 13 for example), so that the supported item(s) to be delivered 54 remains, as discussed below, in a substantially vertical orientation during such movement.

Alternatively, when the movable trolley 18 is moved from the straight second section 14, along the curved section 16, to the straight first section 12 of the curved generally U-shaped guide track 10, each fork 22 is gradually moved from its perpendicular orientation, with respect to the fork platform 20, into its parallel orientation, with respect to the fork platform 20, so that the support the item(s) to be delivered 54 remains in a substantially vertical orientation. A control system C, coupled to and controlling a source of hydraulic fluid (not shown in detail), automatically controls operation of at least the platform hydraulic cylinder(s) 50 of the loading/unloading device(s) so that each of the forks 22 is gradually moved from its perpendicular/parallel orientation toward its parallel/perpendicular orientation, depending upon the direction of travel, so as to support the item(s) to be delivered 54 constantly remains in a substantially vertical orientation. The control system C also controls operation of the drive motor 24 as well as all of the other hydraulic cylinders discussed within this disclosure.

As shown in FIG. 1, typically at least a pair of spaced apart electric/hydraulic loading/unloading devices 2 are supported by the vehicle frame 30 of the delivery vehicle 4. It is to be appreciated that, depending upon the length of the vehicle bed 28, three or more equally spaced apart electric/hydraulic loading/unloading devices 2 may be supported by the vehicle frame 30 along the length thereof. In addition or alternatively, a first pair of spaced apart left side electric/hydraulic loading/unloading devices 2 may supported by the vehicle frame 30 of the delivery vehicle 4 for loading/unloading item(s) to be delivered 54 on the left side of the delivery vehicle 4 while a second pair of spaced apart right side electric/hydraulic loading/unloading devices 2 may supported by the vehicle frame 30 of the delivery vehicle 4 for loading/unloading item(s) to be delivered 54 on the right side of the delivery vehicle 4. Lastly, one or more spaced apart electric/hydraulic loading/unloading devices 2 may be supported toward a rear of the vehicle so as to extend parallel to the vehicle frame 30 and along a longitudinal axis of the delivery vehicle 4 (see FIG. 17) to facilitate loading/unloading item(s) to be delivered 54 from the rear of the delivery vehicle 4.

Figure 18:
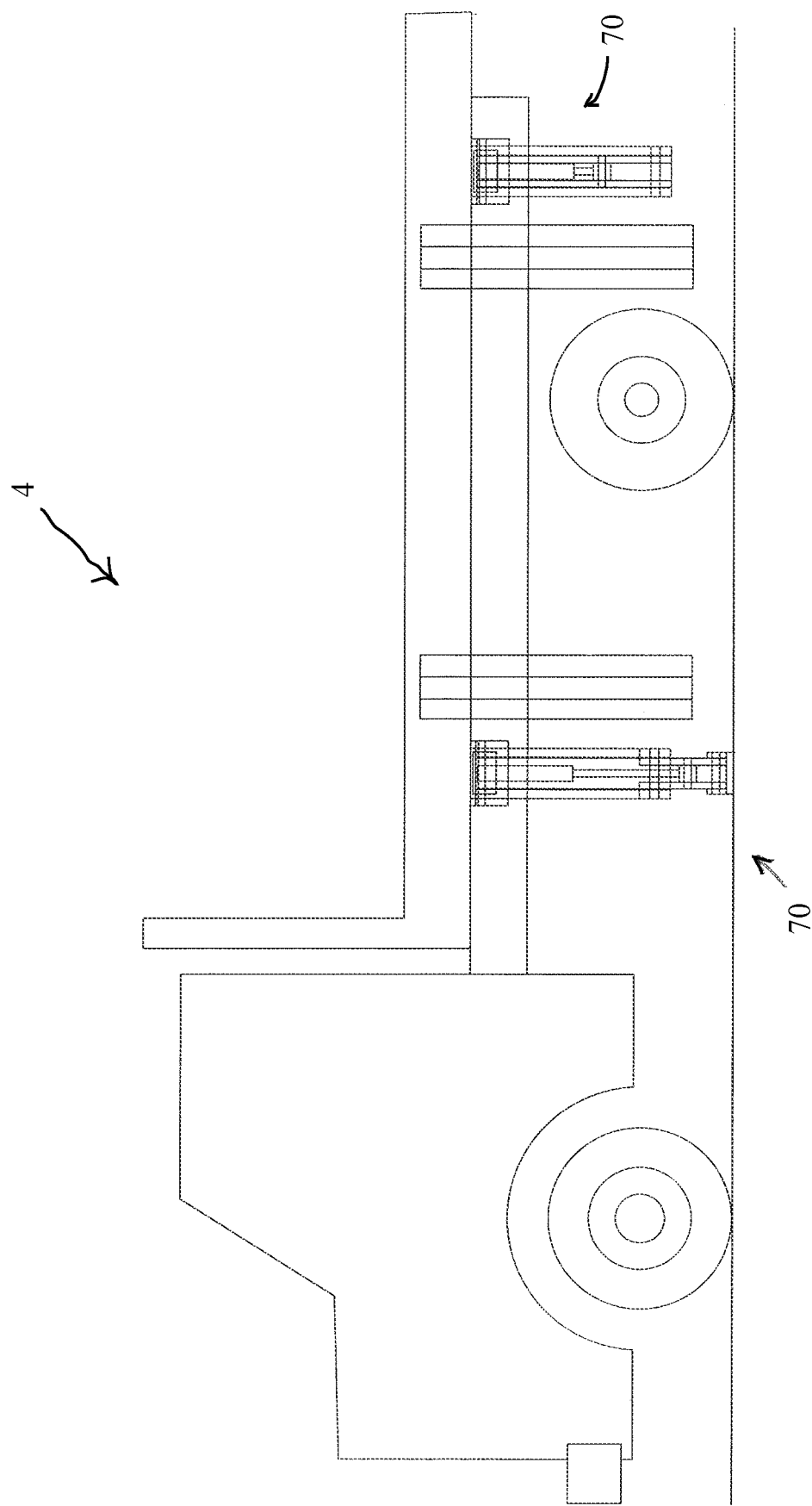
FIG. 18 is a diagrammatic driver's side elevational view of a delivery vehicle, according to the disclosure, equipped with a pair of spaced apart out riggers for providing additional stability for the delivery vehicle when loading/unloading an item(s) from the delivery vehicle.

With reference now to FIGS. 18-21, a detailed description concerning the one or more outriggers for the delivery vehicle 4 will now be discussed. As shown in FIG. 18, the delivery vehicle 4 is typically equipped with at least one (e.g., a centrally located outrigger—not shown) or possible two or more outriggers 70, e.g., a front outrigger and a rear outrigger. As shown, the outriggers 70 are located along the same longitudinal side (e.g., the driver's side) of the delivery vehicle 4 as the side electric/hydraulic loading/unloading devices 2. That is, typically outriggers are only installed along one side of the vehicle. However, when delivering larger/heavier loads, a second set of outriggers may be provided on the opposite side (e.g., the passenger's side) of the delivery vehicle 4 or, possibly, more than two outriggers 70 may be provided along the same side (i.e., the driver's side) of the delivery vehicle 4, without departing from the spirit and scope of the present disclosure. As can be seen in FIG. 18, the front outrigger 70 is shown in its deployed and in-use position while the rear outrigger 70 is shown in its retracted and stowed position.

Figure 19:
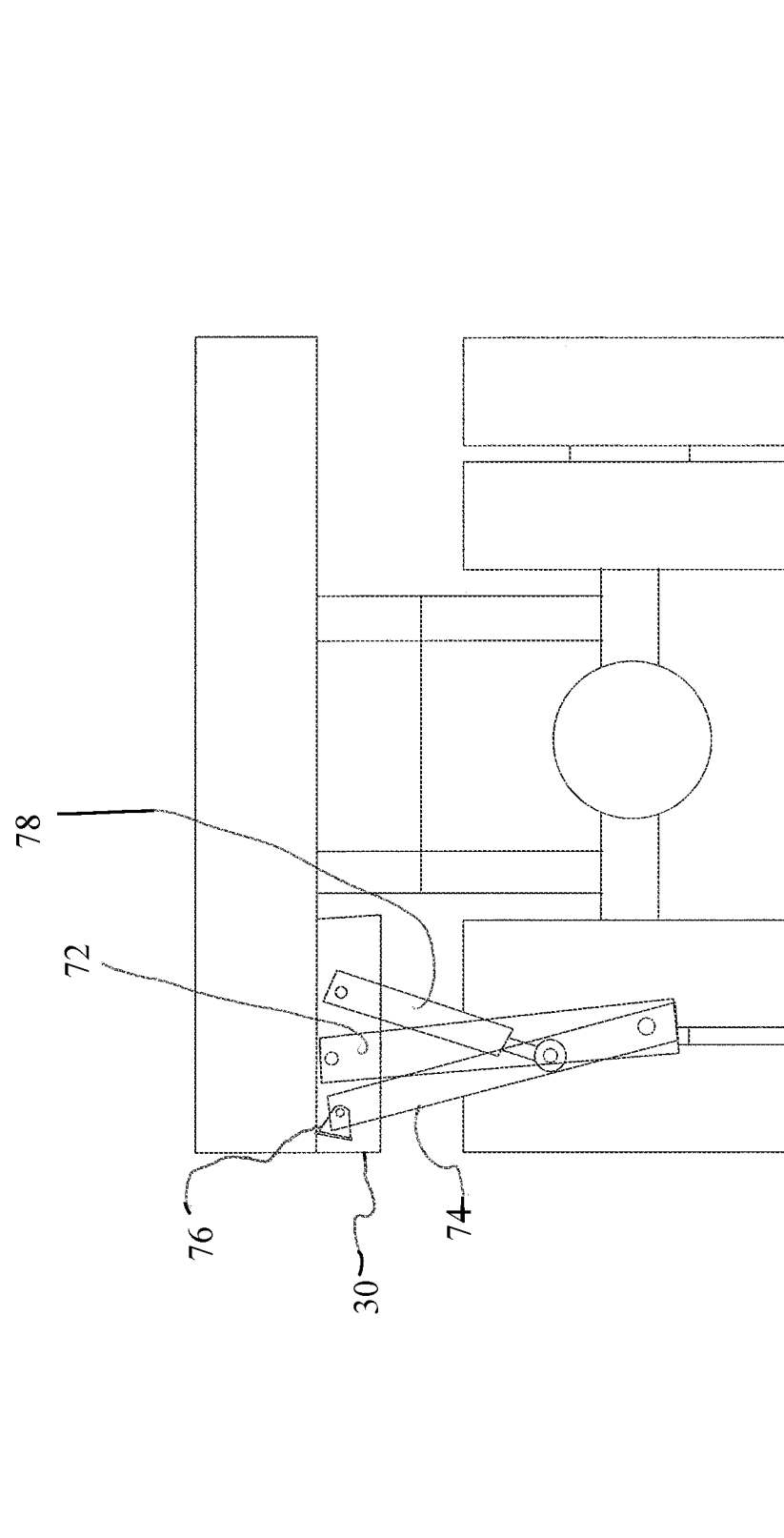
FIG. 19 is a diagrammatic rear elevational view of the delivery vehicle of FIG. 18, according to the disclosure, showing the rear outrigger in its retracted and stowed position with the adjacent electric/hydraulic loading/unloading device being remove for reasons of clarity.
Figure 20:
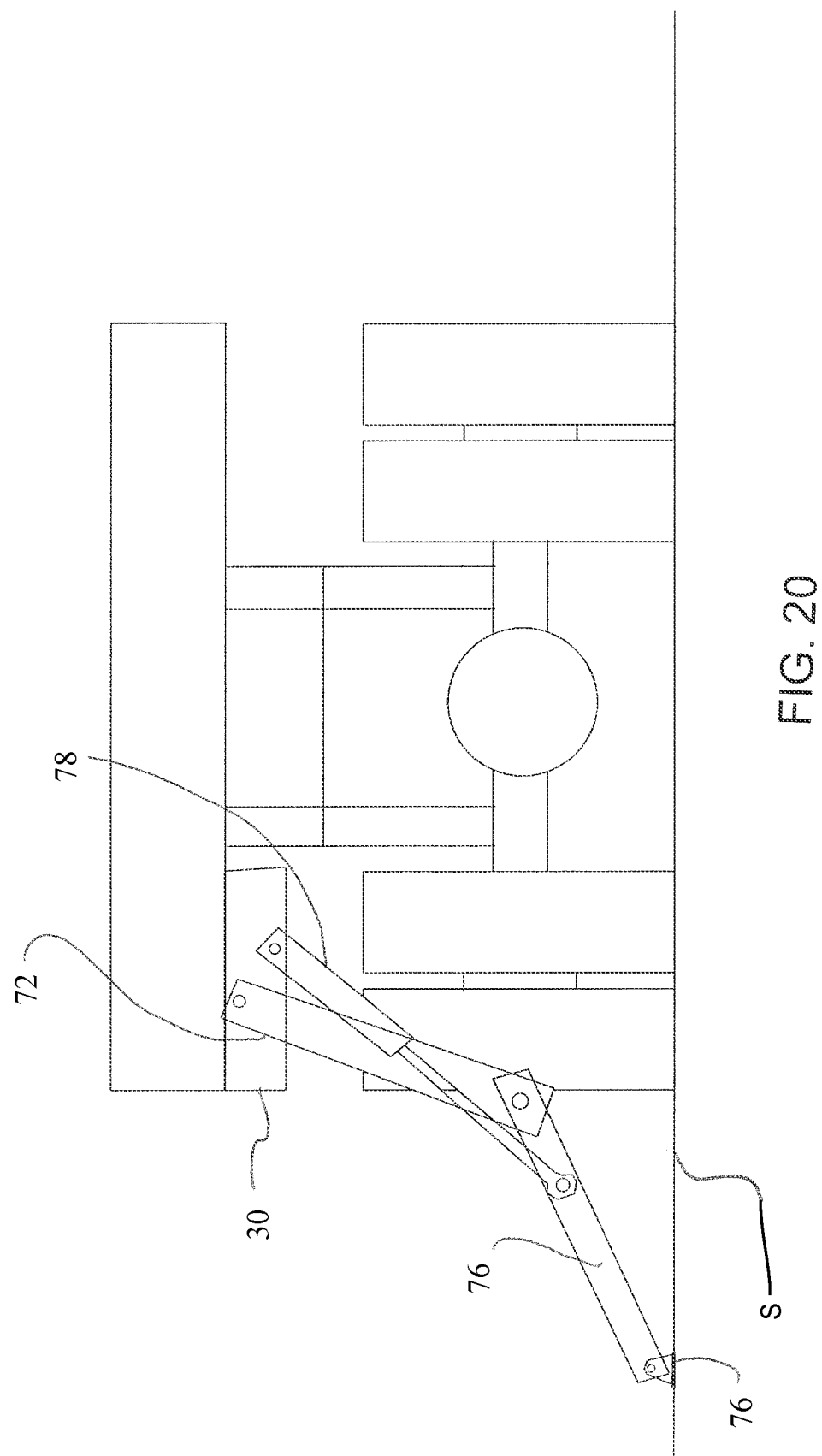
FIG. 20 is a diagrammatic rear elevational view of the delivery vehicle of FIG. 18, according to the disclosure, showing the rear outrigger in its deployed and in-use position with the adjacent electric/hydraulic loading/unloading device being remove for reasons of clarity.
Figure 21:
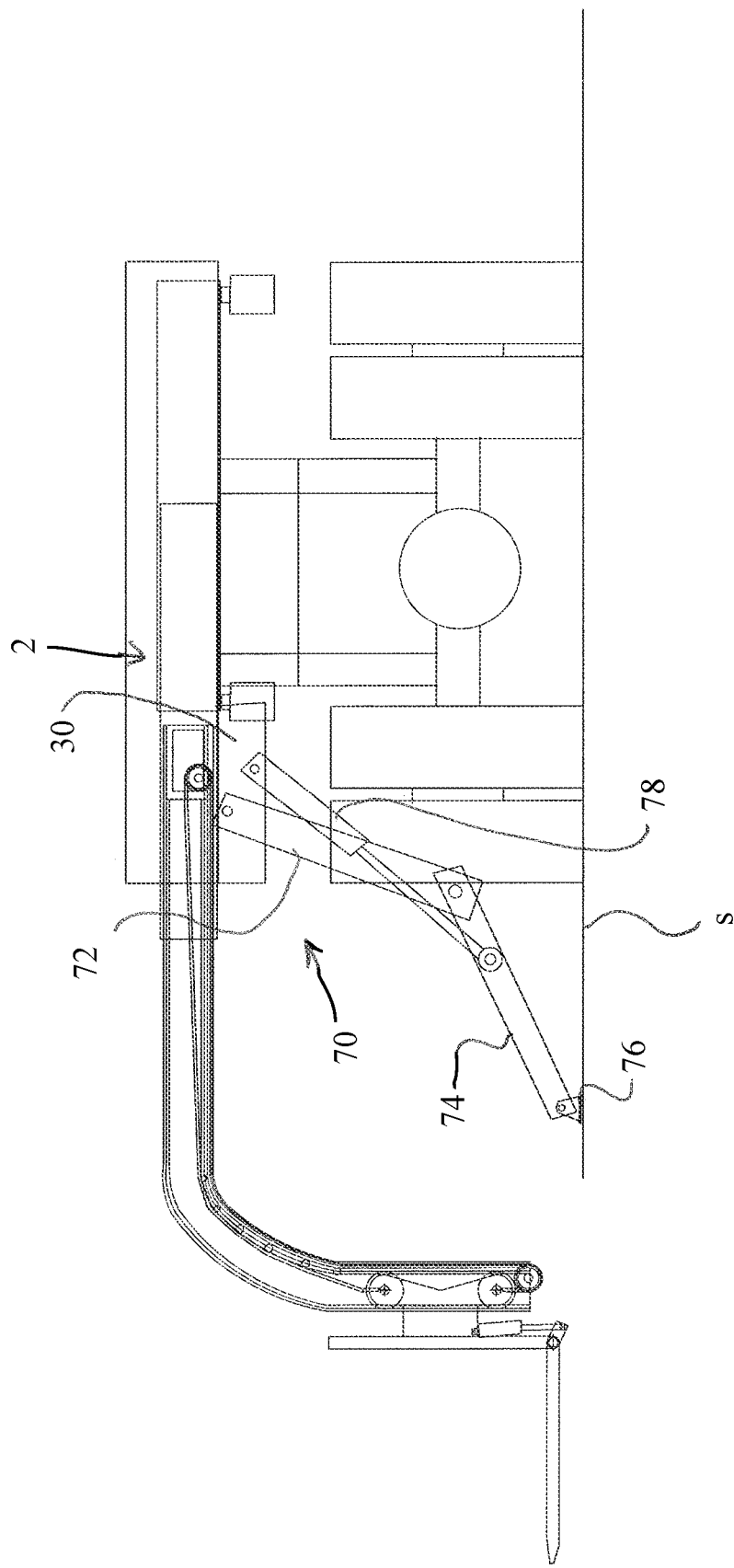
FIG. 21 is a diagrammatic rear elevational view of the delivery vehicle of FIG. 18, according to the disclosure, showing the rear outrigger in its deployed and in-use position with the adjacent electric/hydraulic loading/unloading device being shown in its extending position for loading/unloading an item(s) to be delivered.

As best shown in FIGS. 19-21, each of the front and the rear outriggers 70 generally comprises first and second linkage members 72, 74. A first end of the first linkage member 72 is fastened, by a conventional fastener, to the vehicle frame or body 30 so as to allow that first end of the first linkage member 72 to pivot or move with respect to the vehicle frame or body 30 over a relatively small range of movement. The second end of the first linkage member 72 is pivotally connected, by a conventional fastener, to a first end of the second linkage member 74 so as to permit relative pivoting motion between the first and the second linkage members 72, 74. A ground engaging foot 76 is pivotally connected, by a conventional fastener, to the second end of the second linkage member 74. An outrigger hydraulic piston/cylinder 78 is provided for moving each respective outrigger 70 between its stowed position and its deployed position, and vice versa. Each one of the outrigger hydraulic piston/cylinders 78 is connected to the hydraulic source H (not shown in detail) to facilitate operation of each respective outrigger 70. A cylinder end of the hydraulic piston/cylinder 78 is pivotably connected to the vehicle frame or body 30 while a piston end of the hydraulic piston/cylinder 78 is pivotably connected to the second linkage member 74.

When a first side of the outrigger hydraulic piston/cylinder 78 is supplied with hydraulic fluid, an overall axial length of the outrigger hydraulic piston/cylinder 78 is increased (i.e., the associated outrigger 70 is moved into its extended position) and each of the first and second linkage members 72, 74 are moved from their folded and stowed position (see FIG. 19) into their extended and in-use position (see FIGS. 20 and 21) where the first and second linkage members 72, 74 are generally aligned, end to end, with respect to one another, and form about a 160±20 degree angle therebetween and the foot 76 engages with the ground, or some other surface S, to provide an enlarged vehicle footprint and provide additional stability to the delivery vehicle 4 when loading/unloading an item(s) 54 to be delivered.

When a second side of the outrigger hydraulic piston/cylinder 78 is supplied with hydraulic fluid, the overall axial length of the outrigger hydraulic piston/cylinder 78 is decreased (i.e., the associated outrigger 70 is moved into its stowed position), each of the first and second linkage members 72, 74 are moved from their deployed and in-use position (see FIGS. 20 and 21) back into their folded and stowed position (see FIG. 19) where the first and second linkage members 72, 74 are located closely adjacent one, almost parallel to another, to form a small angle therebetween and facilitate travel of the delivery vehicle 4.

Once the front and rear outriggers 70 are deployed into their in-use position, as generally shown in FIG. 21, then the electric/hydraulic loading/unloading devices 2 can be operated to deliver an item(s) to be delivered 54 in an efficient and stable manner, as discussed below. After the item(s) to be delivered 54 is either delivered or retrieved from the site, then each one of the outriggers 70 is moved back into its folded and stowed position (see FIG. 19) to facilitate travel of the delivery vehicle 4, either to another delivery location(s) or back to the factory to facilitate delivery of another load of items to be delivered 54.

To facilitate loading/unloading of different size, shape and weighed item(s) to be delivered 54 by the delivery vehicle 4, one or more of the loading/unloading device(s) 2 may be supported on an adjustable track or slider (not shown) that allows for adjacent loading/unloading device(s) 2 to move either closer to or further apart from one another. To facilitate such adjustment or sliding movement of the loading/unloading device(s) 2, it is to be appreciated that the width of the loading/unloading channels 68 must be increased. After the loading/unloading device(s) 2 is repositioned, by an operator, into its desired adjusted position, such adjusted position can, thereafter, then be locked or clamped, in a conventional manner, so as to retain the loading/unloading device(s) 2 in such adjusted position.

In addition, each one of the outriggers 70 can be supported on an adjustable track or slider (not shown) so that the exact position or location of each outrigger(s) 70, along the longitudinal axis of the delivery vehicle 4, e.g., toward either the front or the rear of the vehicle, can be readily adjusted to assist with loading/unloading of different size, shape and weighed item(s) to be delivered 54. After each one of the outriggers 70 is adjusted, by an operator, into its desired adjusted position, such adjusted position of the outrigger 70 can then locked so as to retain the outrigger in that adjusted position.

At a factory, storage facility, loading dock, etc., the item(s) to be delivered 54 is/are loaded onto the vehicle bed 28 in a conventional manner, e.g., by a fork lift, crane, etc. (not shown), with the item(s) to be delivered 54 last typically being loaded on the vehicle bed 28 first, while the item(s) to be delivered 54 first typically being loaded on the vehicle bed 28 last. An operator then drives the loaded delivery vehicle 4 to a desired destination to commence unloading of the item(s) to be delivered 54.

Figure 22B:
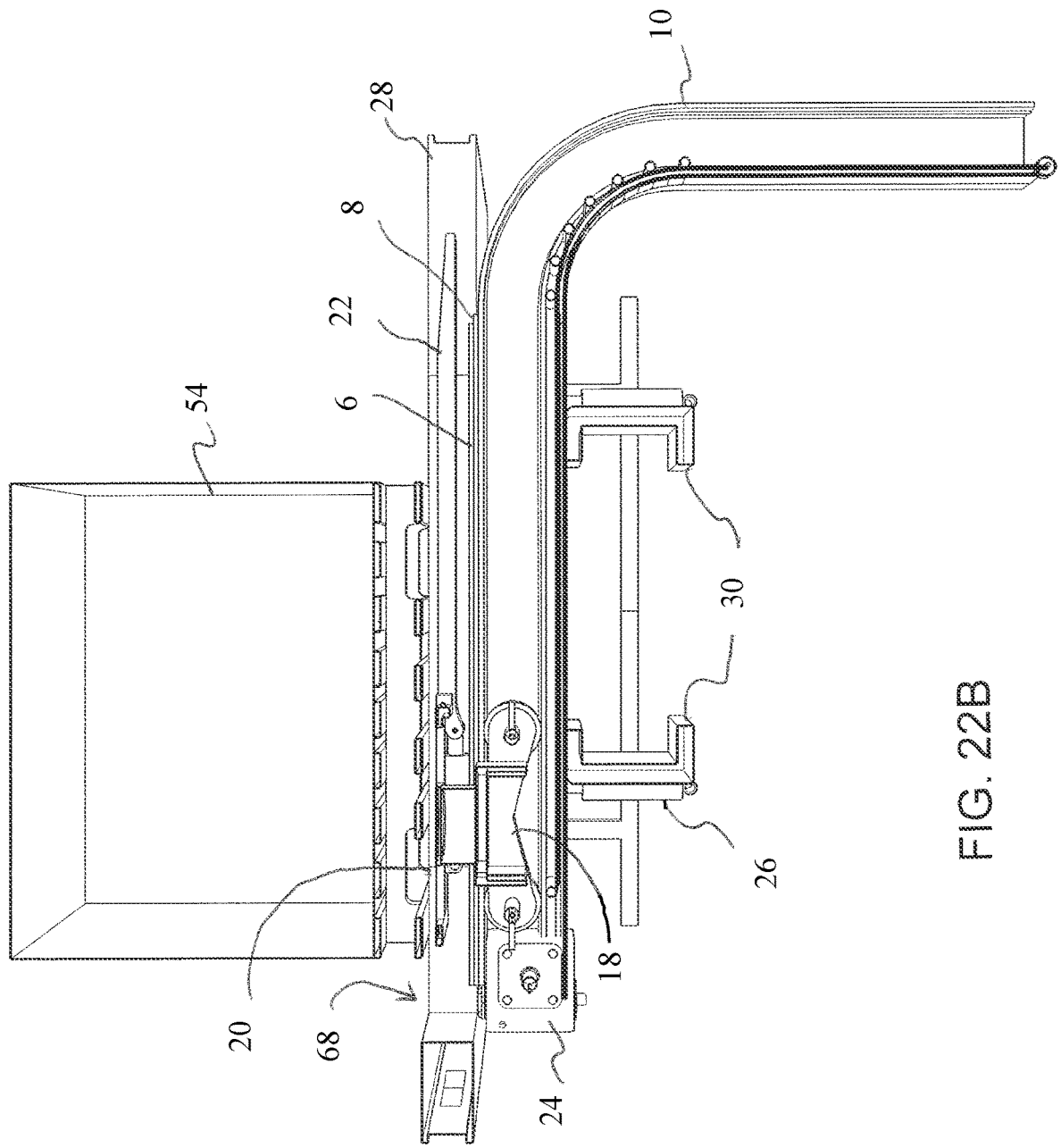
FIG. 22B is a diagrammatically cross sectional view showing the item(s) to be delivered resting on the vehicle bed with the fork platform of the electric/hydraulic loading/unloading device being moved, within the loading/unloading recess, to a location directly vertically below but still out of engagement with the item(s) to be delivered.
Figure 22C:
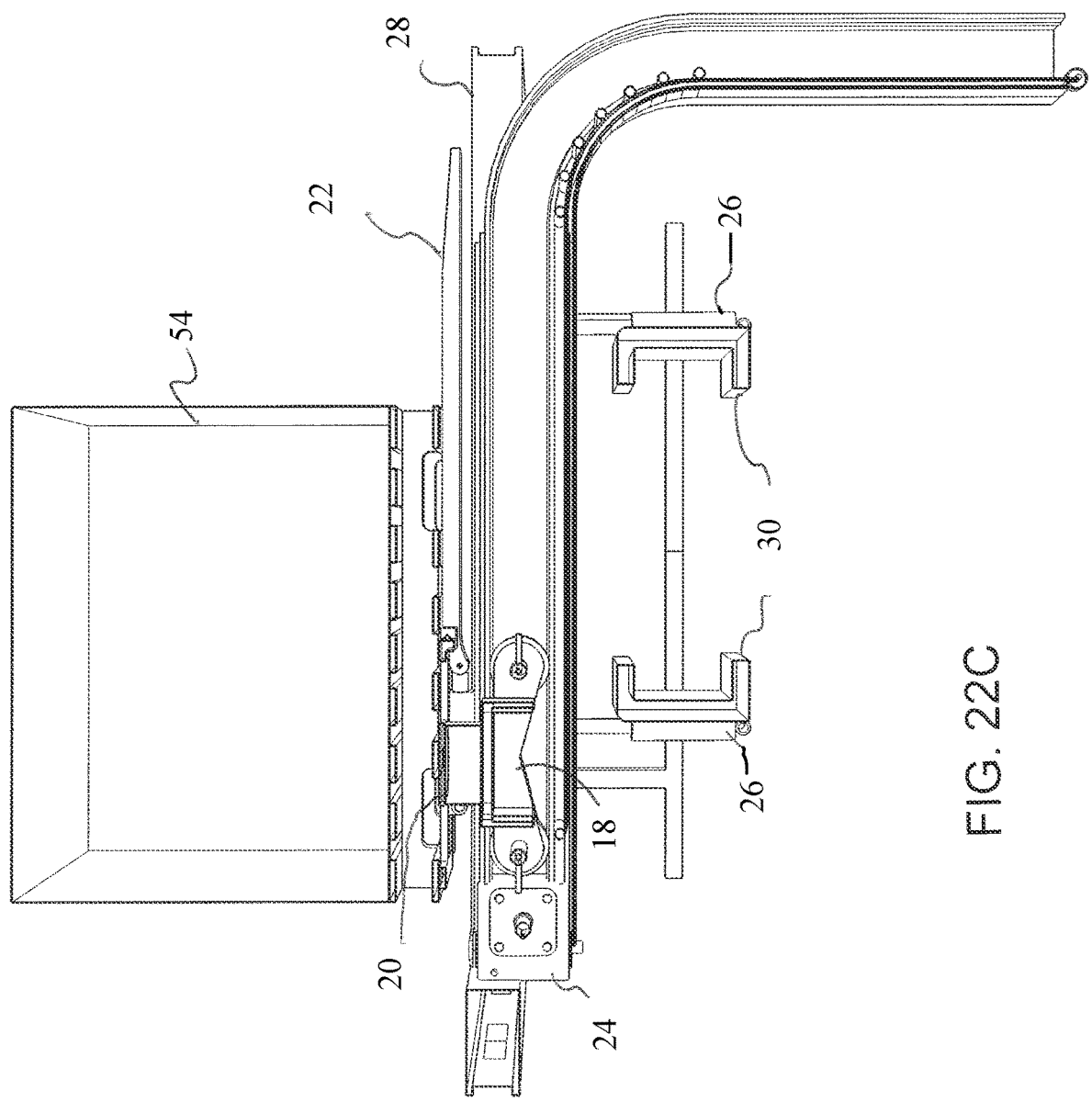
FIG. 22C is a diagrammatically cross sectional view showing the fork platform of the electric/hydraulic loading/unloading device being raised, by the lifting members, to temporarily lift the item(s) to be delivered off of the vehicle bed.
Figure 22D:
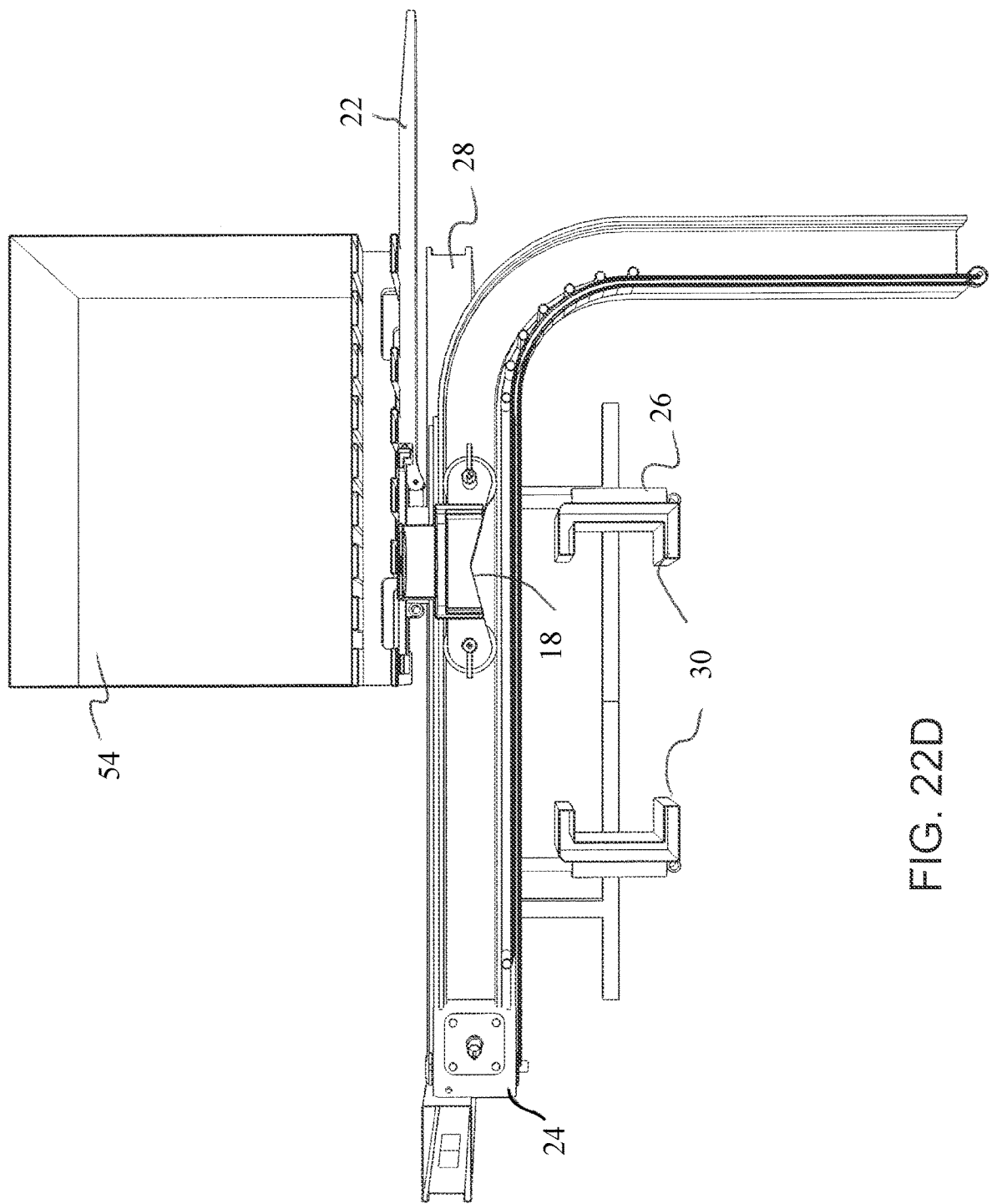
FIG. 22D is a diagrammatically cross sectional view showing the item(s) to be delivered being repositioned by the fork platform of the electric/hydraulic loading/unloading device toward an opposite other side of the vehicle bed for unloading.
Figure 22E:
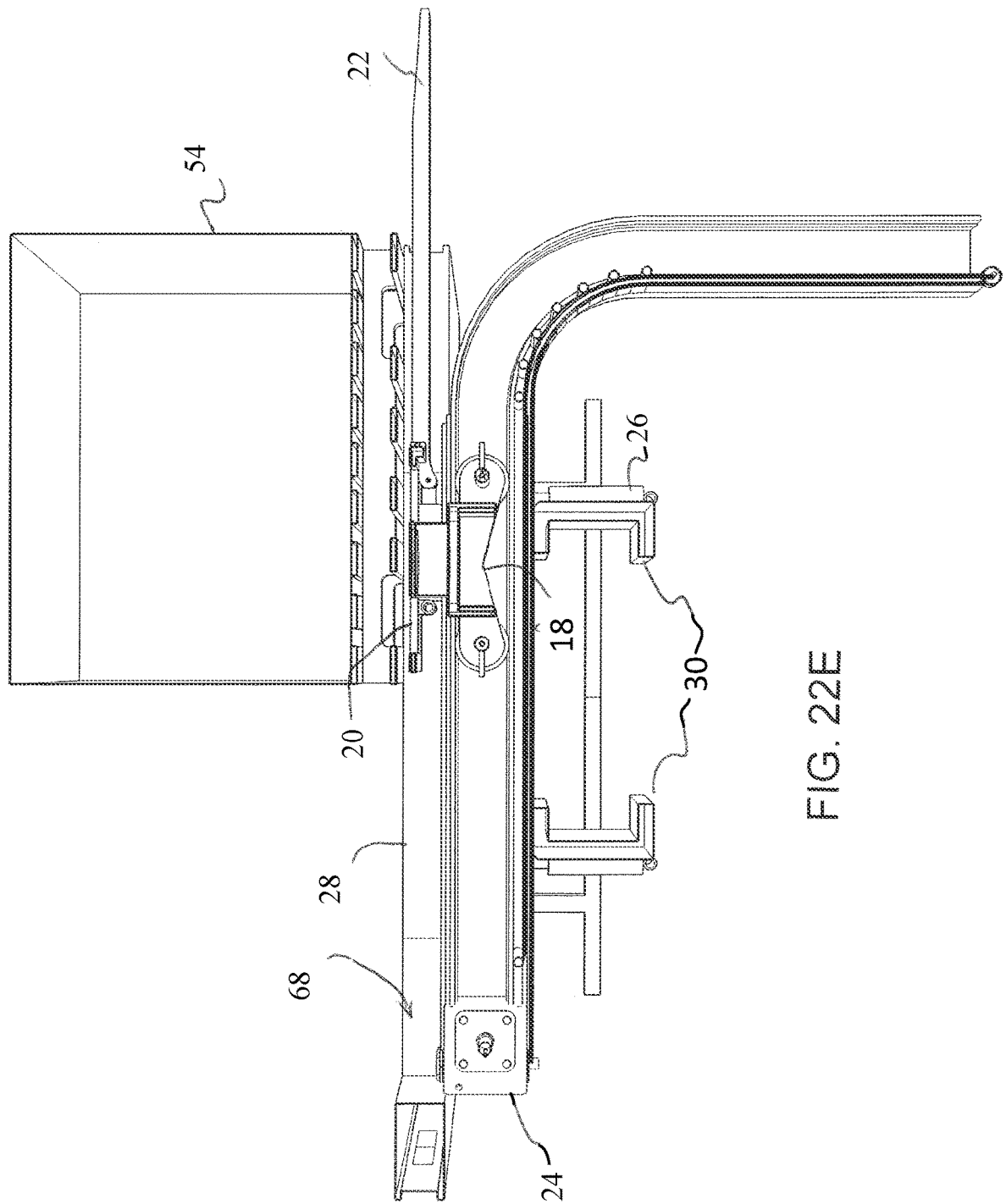
FIG. 22E is a diagrammatically cross sectional view showing the item(s) to be delivered being lowered so as to be again supported by the vehicle bed with the fork platform of the electric/hydraulic loading/unloading device being lowered into the loading/unloading recess vertically below and out of engagement with the item(s) to be delivered.
Figure 22F:
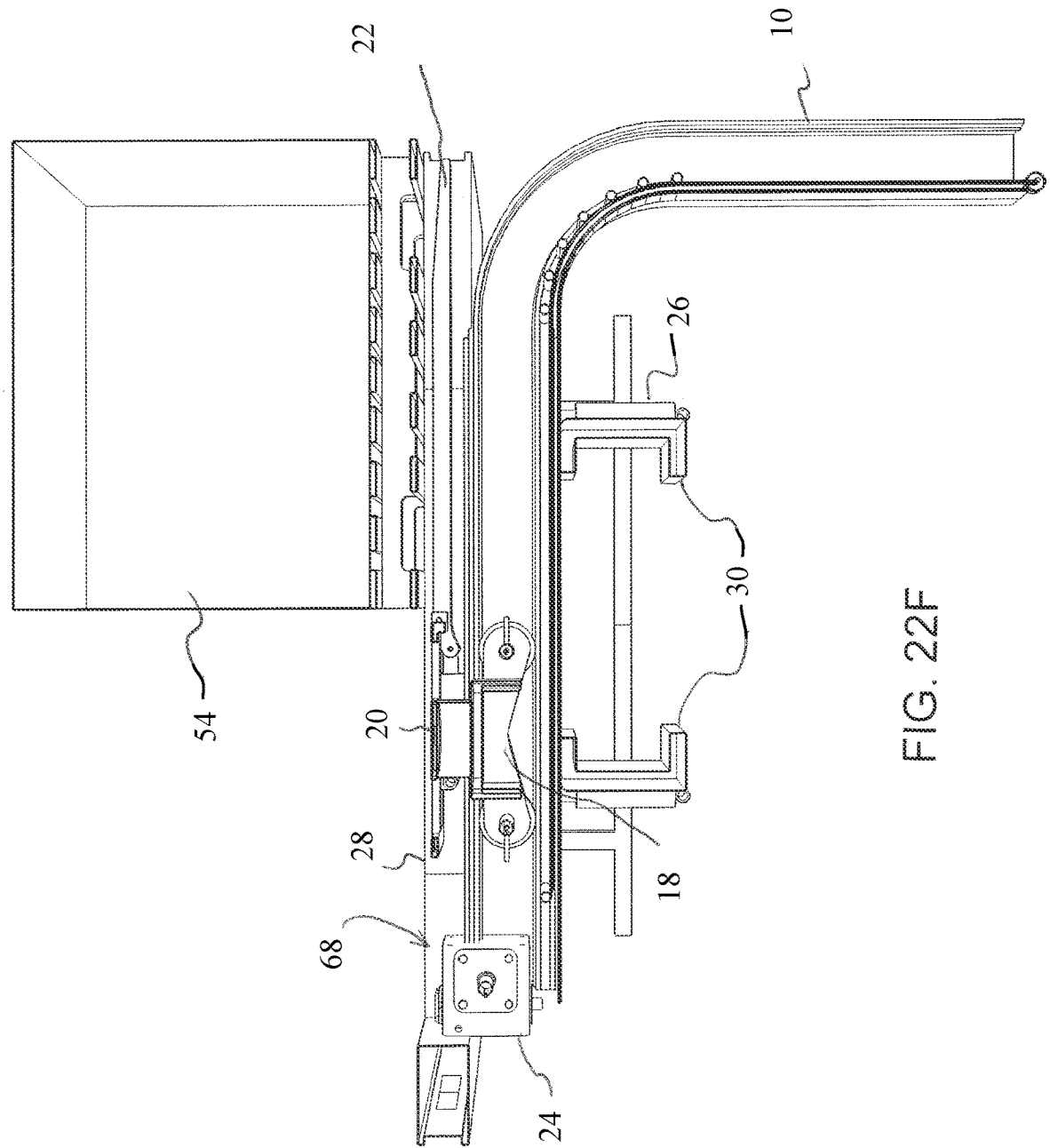
FIG. 22F is a diagrammatically cross sectional view showing the forks of the electric/hydraulic loading/unloading device being moved, within the loading/unloading recess, to a location directly vertically below but out of engagement with the item(s) to be delivered so that the item(s) to be delivered is still supported by the vehicle bed.
Figure 22G:
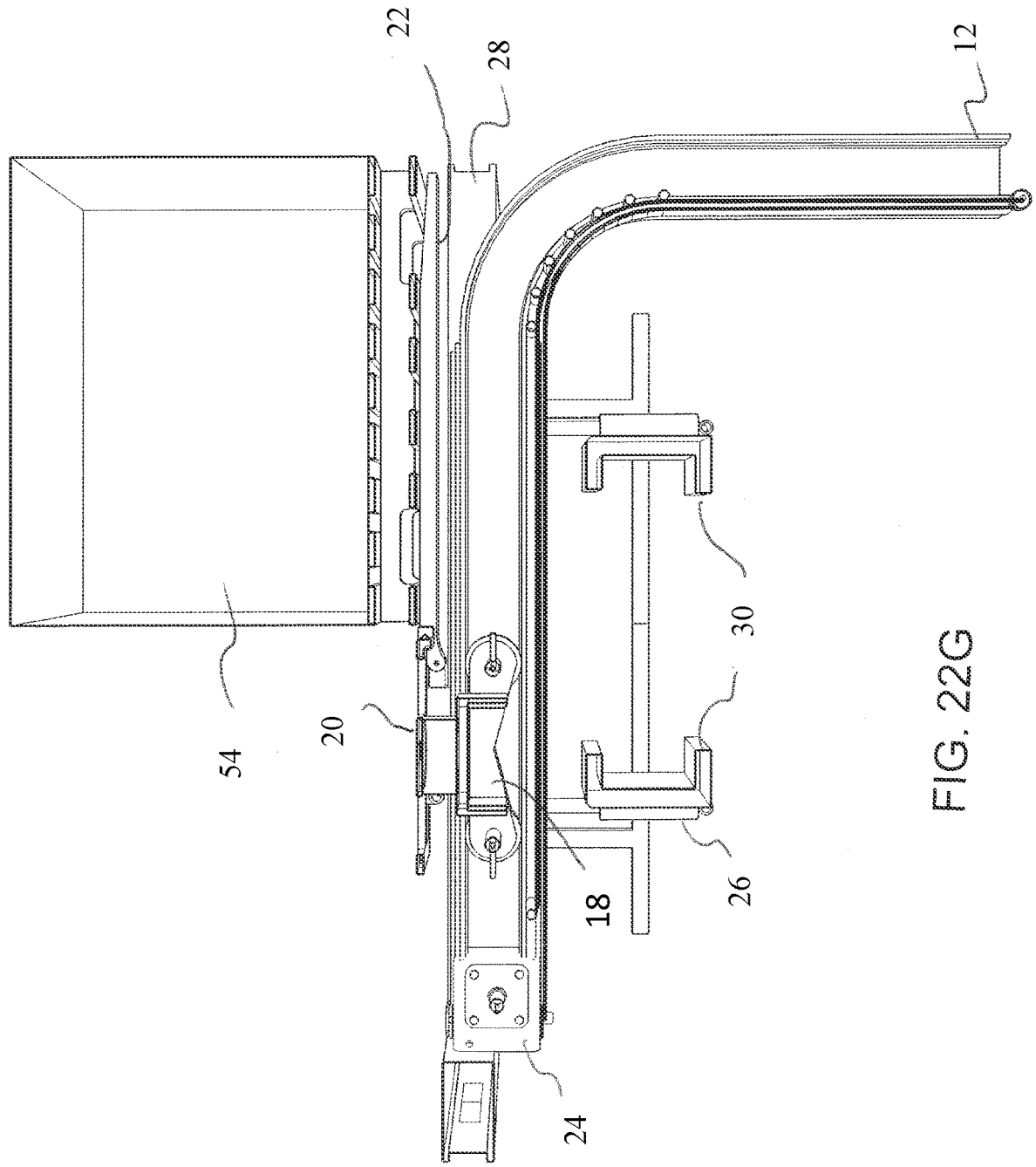
FIG. 22G is a diagrammatically cross sectional view showing the fork(s) of the electric/hydraulic loading/unloading device being raised, by operation of the lifting members, so that the forks again lift the item(s) to be delivered off of the vehicle bed and the item(s) to be delivered is now supported solely by the fork(s)
Figure 22H:
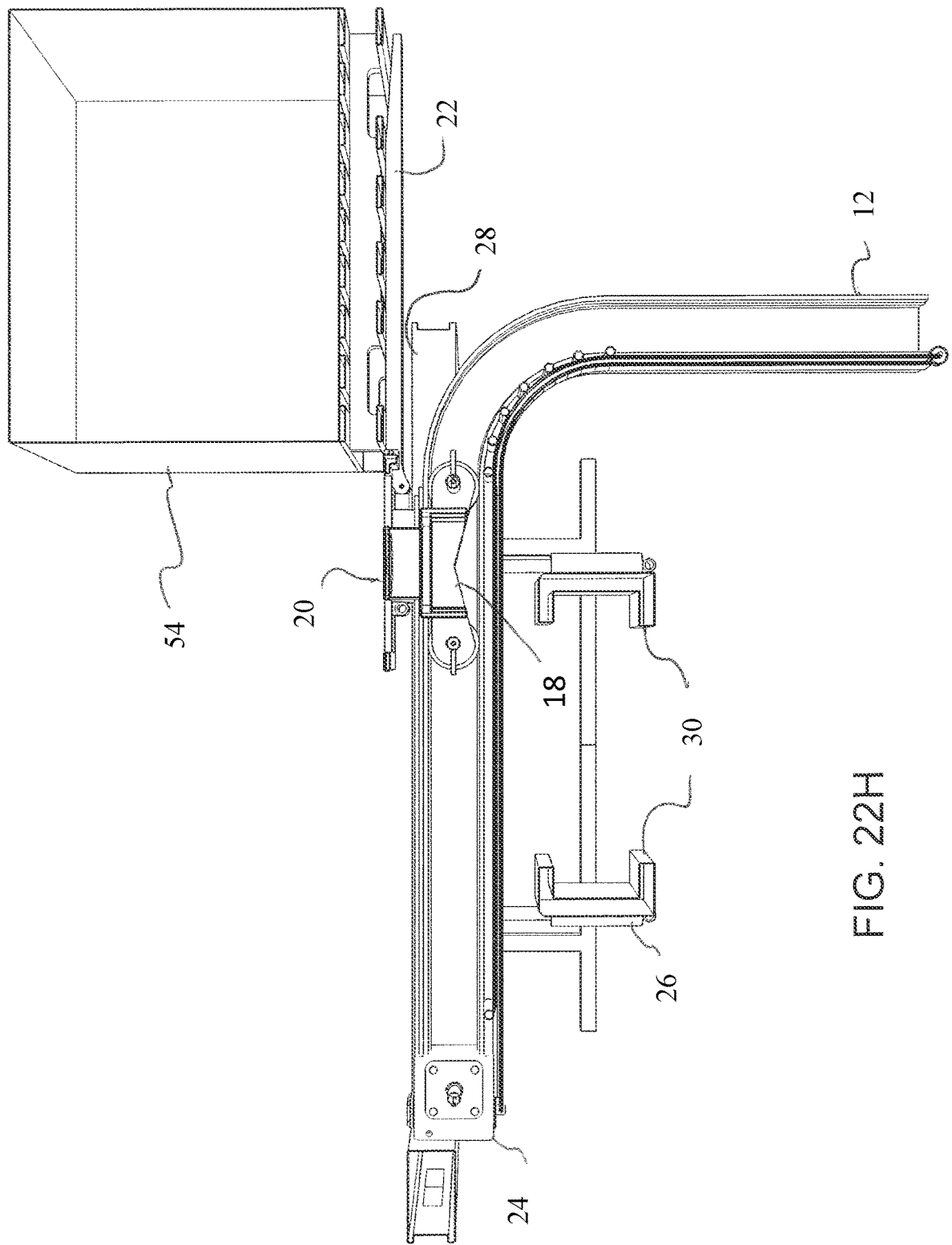
FIG. 22H is a diagrammatically cross sectional view showing the movable trolley, the fork(s) of the electric/hydraulic loading/unloading device and the item(s) to be delivered commencing movement toward the second end of the curved generally U-shaped guide track.
Figure 22J:
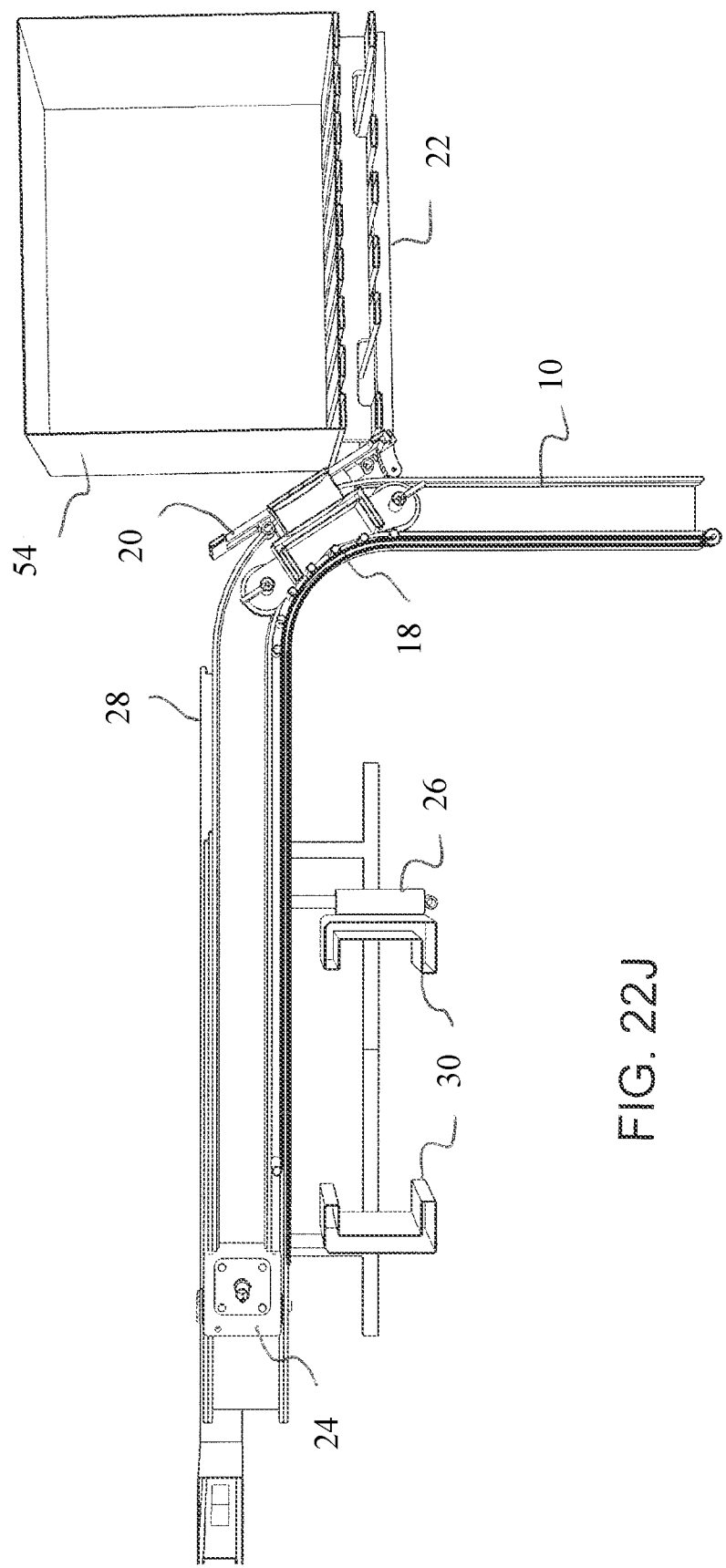
FIG. 22J is a diagrammatically cross sectional view showing further movement of the movable trolley, the fork(s) of the electric/hydraulic loading/unloading device and the item(s) to be delivered around the curved section and toward the second end of the curved generally U-shaped guide track with the fork(s) being moved relative to the fork platform to maintain the item(s) to be delivered in a substantially vertical orientation.
Figure 22K:
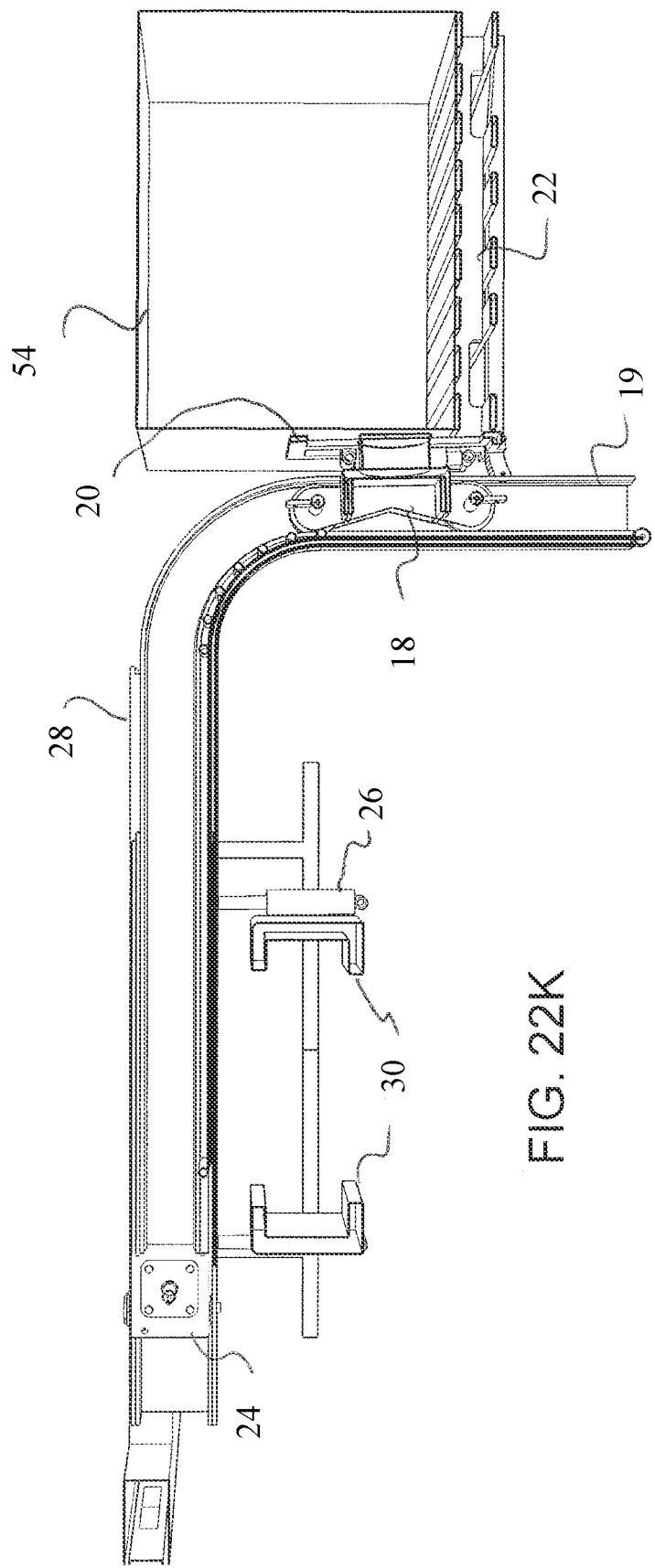
FIG. 22K is a diagrammatically cross sectional view showing still further movement of the movable trolley, the fork(s) of the electric/hydraulic loading/unloading device and the item(s) to be delivered along the second section of the curved generally U-shaped guide track, toward the second end thereof, with the fork(s) now substantially perpendicular to the fork platform.
Figure 22L:
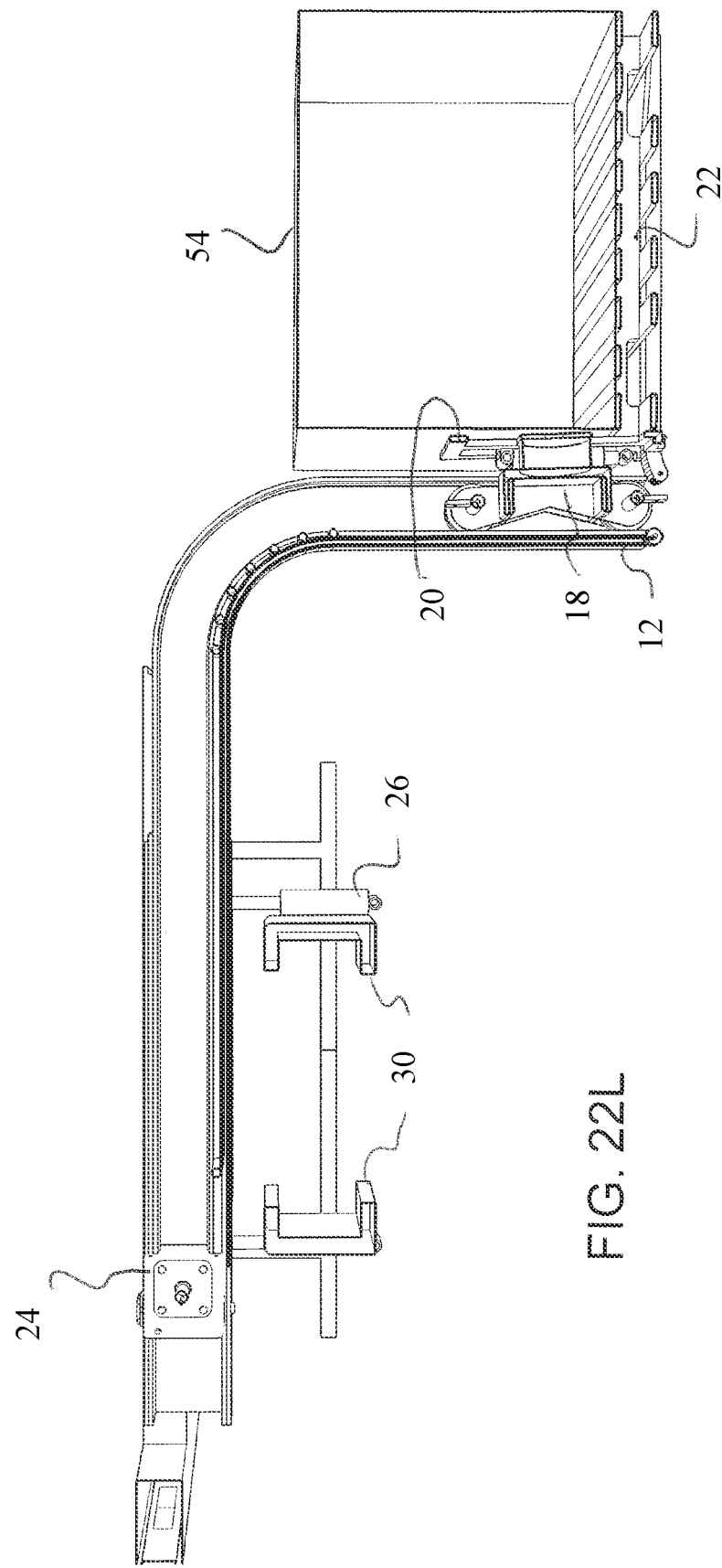
FIG. 22L is a diagrammatically cross sectional view showing the movable trolley, the fork(s) of the electric/hydraulic loading/unloading device and the item(s) to be delivered moved to the second end of the curved generally U-shaped.
Figure 22M:
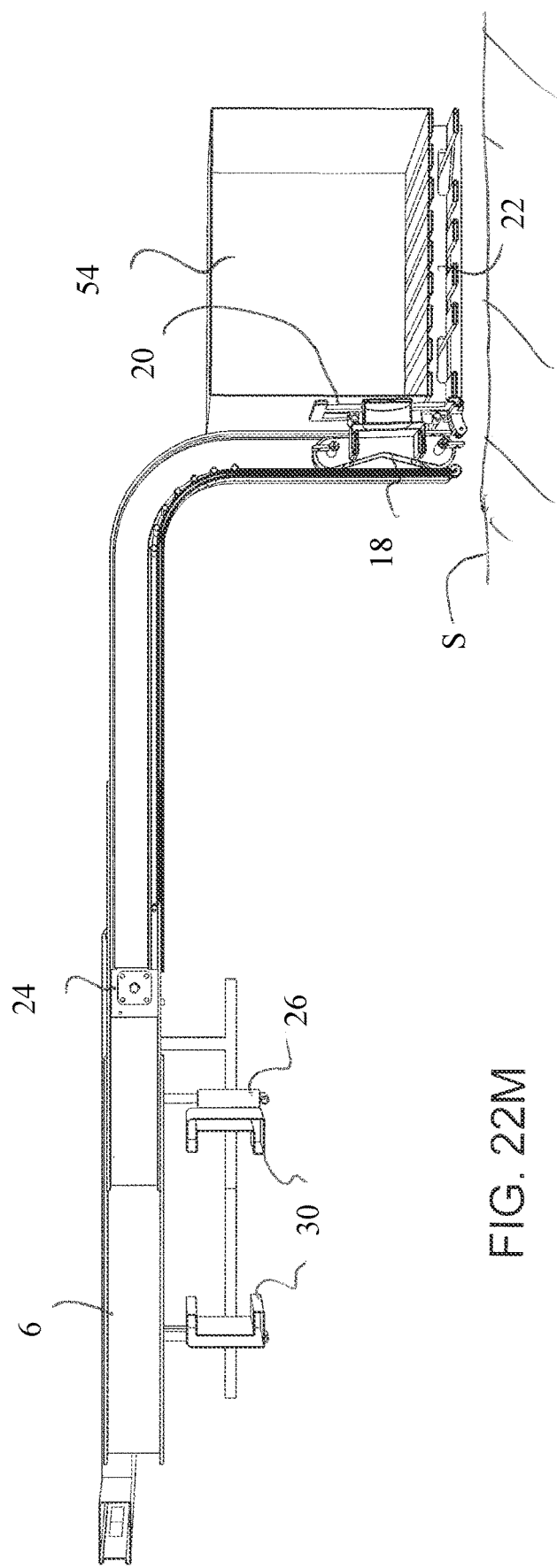
FIG. 22M is a diagrammatically cross sectional view showing the inner nest track and the curved generally U-shaped guide track being moved away from and out of the outer nested track movable trolley and further away from the delivery vehicle.
Figure 22N:
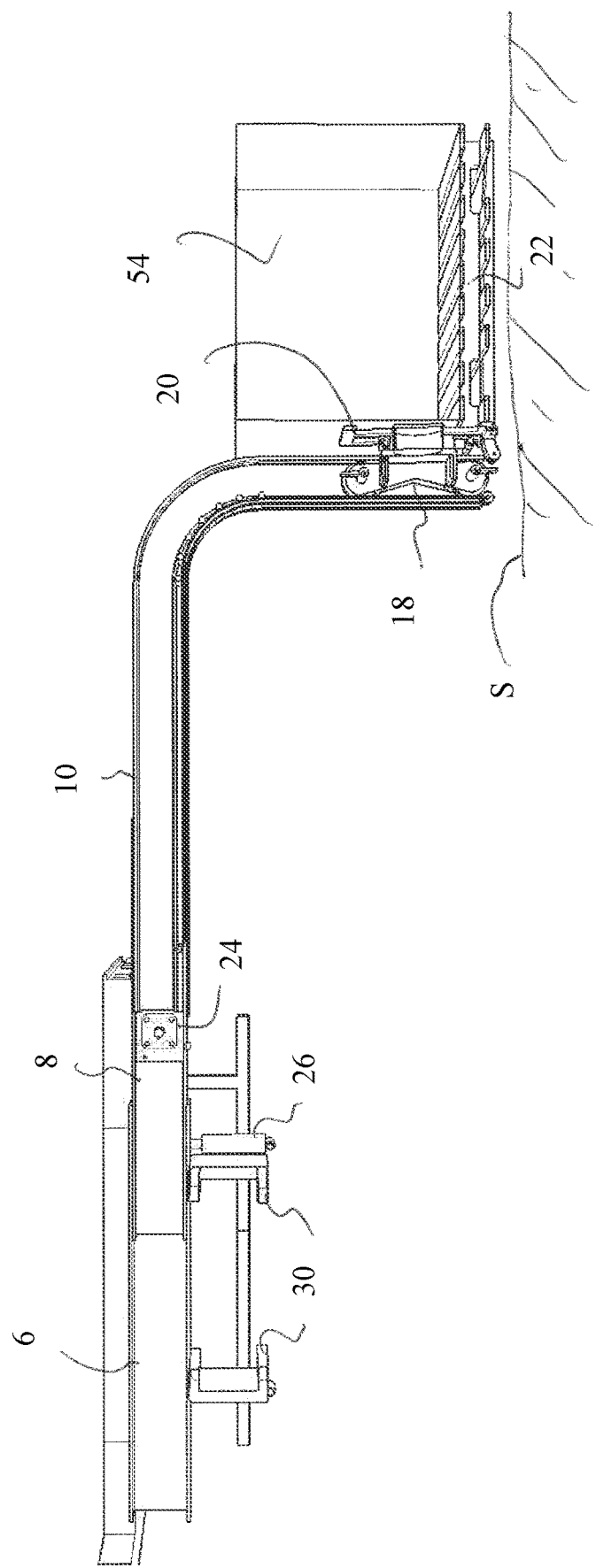
FIG. 22N is a diagrammatically cross sectional view showing the outer nested track, the inner nest track, the curved generally U-shaped guide track and the item(s) to be delivered being lowered, by the lifting members (the track hydraulic cylinders), toward the ground or some other supporting surface.
Figure 22O:
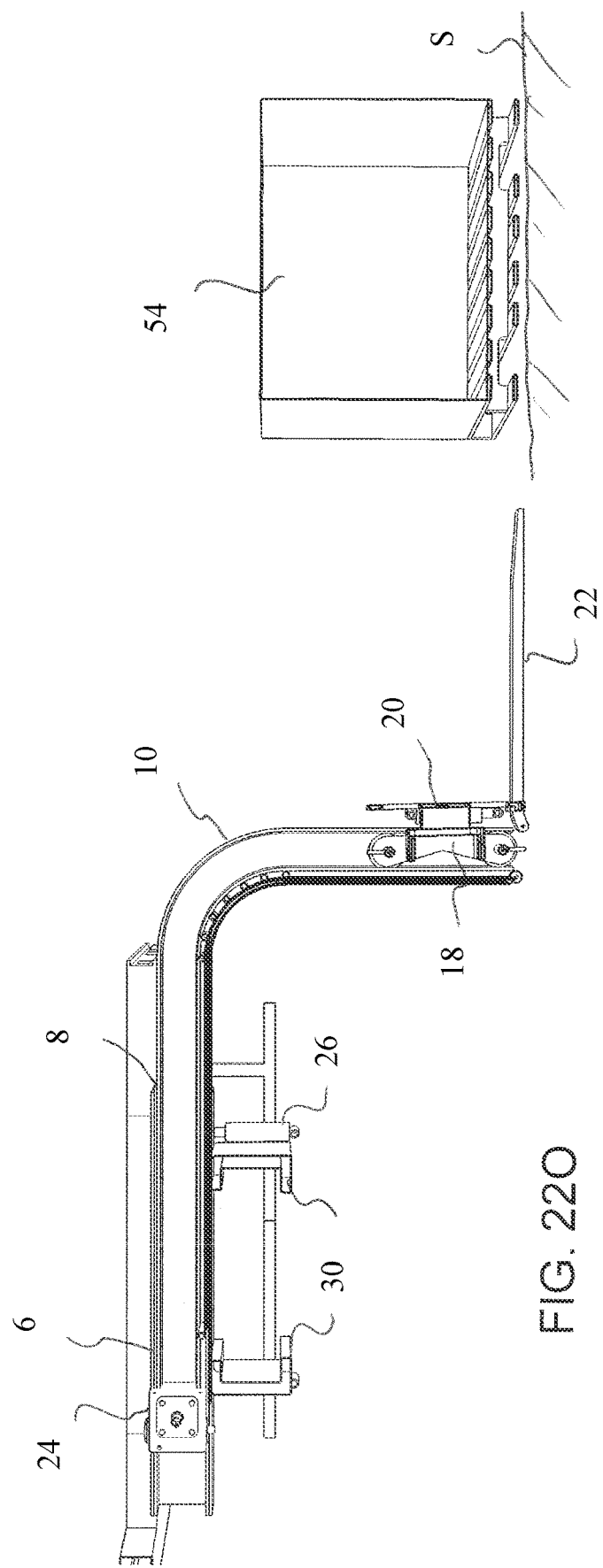
FIG. 22O is a diagrammatically cross sectional view showing the inner nest track, the curved generally U-shaped guide track, and the fork(s) being moved toward the delivery vehicle so as to release and transfer the item(s) to be delivered from the fork(s) to the ground or some other supporting surface.

With reference now to FIGS. 22A-22O, unloading of the item(s) to be delivered 54 will now be discussed in detail. As can be seen in FIG. 22A, the item(s) to be delivered 54 is shown located along the right (passenger) side of the vehicle bed 28 of the delivery vehicle 4. Upon arrival at the delivery location, the operator will maneuver the delivery vehicle 4 adjacent the delivery location, with the left (driver) side of the delivery vehicle 4 directly adjacent and facing the delivery location. Once properly positioned, the operator will then stop the delivery vehicle 4 and prepare to commence unloading of the item(s) to be delivered 54. Next, the operator will deploy each one of the outriggers 70 to stabilize the delivery vehicle 4 during the loading and unloading process. For the sake of clarity, the outriggers 70 are not shown in any of FIGS. 22A-22O but, as discussed above, the outriggers 70 are deployed in order to stabilize the delivery vehicle 4 during the loading/unloading process.

As shown in FIG. 22A, the forks 22 and the fork platform 20 are both shown recessed slightly vertically below and within one of the loading/unloading channels 68 formed in the vehicle bed 28. Each loading/unloading channel 68, formed in the vehicle bed 28, is open at one end thereof and closed at the opposite end thereof. The operator then operates the drive motor 24 to rotate the drive motor 24 counter clockwise so that the chain, wire or some other conventional drive member 56, pulls the movable trolley 18 toward the drive motor 24 and the first end of the curved generally U-shaped guide track 10 so that the fork platform 20 is eventually located vertically under the item(s) to be delivered 54 (see FIG. 22B).

Next, the operator, actuates all of (e.g., the first and the second, and possibly third and fourth) the lifting members 26 simultaneously with one another to lift the inner and outer nested tracks 6, 8, the curved generally U-shaped guide track 10, the fork platform 20, the fork(s) 22 as well as the item(s) to be delivered 54 (see FIG. 22C). Due to such lifting motion, the item(s) to be delivered 54 is thus temporarily supported by the loading platform of the loading/unloading device(s) 2. Thereafter, the operator then again actuates the drive motor 24 to rotate the drive motor 24 clockwise so that the chain, wire or some other conventional drive member 56, pulls the movable trolley 18 as well as the item(s) to be delivered 54 away from the drive motor 24 and toward the second end of the curved generally U-shaped guide track 10, e.g., toward the left (driver) side of the delivery bed (see FIG. 22D).

The operator then again actuates the first and second lifting member 26 simultaneously with one another to lower the inner and the outer nested tracks 6, 8, the curved generally U-shaped guide track 10, the fork platform 20 and the fork(s) 22 into the loading/unloading channel(s) 68 and thereby lowers the item(s) to be delivered 54 back onto the delivery bed (see FIG. 22E).

The operator then again operates the drive motor 24 to rotate counter clockwise again so that the chain, wire or some other conventional drive member 56, pulls the movable trolley 18 toward the drive motor 24 and the first end of the curved generally U-shaped guide track 10 until the fork(s) 22 are thus positioned under the item(s) to be delivered 54 so that only the fork(s) 22 will support the item(s) to be delivered 54 (see FIG. 22F). If necessary, the overall length of the fork(s) 22 can be adjusted, e.g., increased or decreased, as desired. Next, the operator, again actuates all of (e.g., the first and the second) the lifting members 26 simultaneously with one another to lift the inner and outer nested tracks 6, 8, the curved generally U-shaped guide track 10, the fork platform 20, the fork(s) 22 as well as the item(s) to be delivered 54 (see FIG. 22G). Due to such lifting, the item(s) to be delivered 54 is now supported solely by the fork(s) 22 of the loading/unloading device(s) 2.

Thereafter, the operator now actuates the drive motor 24 to rotate the drive motor 24 clockwise so that the chain, wire or some other conventional drive member 56, commences pulling or conveying the movable trolley 18 as well as the item(s) to be delivered 54 away from the drive motor 24 and toward the second end 12 of the curved generally U-shaped guide track 10 (see FIG. 22H). Typically before the movable trolley 18 and the supported item(s) to be delivered 54 travel around the curved generally U-shaped guide track 10, the at least one nested track cylinder(s) 32 is actuated, by the control system C, to move the inner nested track 8 and the curved generally U-shaped guide track 10 relative to the outer nested track 6, as generally shown in FIG. 22I.

As the movable trolley 18 and the supported item(s) to be delivered 54 travel around the curved generally U-shaped guide track 10, the orientation of the forks 22 are gradually altered, by the control system C, so as to maintain the item(s) to be delivered 54 in a substantially vertical orientation (see FIG. 22J), i.e., the fork(s) 22 are gradually pivoted from being substantially parallel to the fork platform 20 into being substantially perpendicular to the fork platform 20 (see FIG. 22K). The drive motor 24 continues moving the movable trolley 18 and the supported item(s) to be delivered 54 until the movable trolley 18 and the supported item(s) to be delivered 54 are at or adjacent the second end 12 of the curved generally U-shaped guide track 10 (see FIG. 22L). The operator then discontinues operation of the drive motor 24 and movement of the movable trolley 18 and the supported item(s) to be delivered 54 along the curved generally U-shaped guide track 10.

The operator next actuates the at least one nested track cylinder(s) 32, via the control system C, to move the second end of the curved generally U-shaped guide track 10 and the supported item (s) to be delivered 54 further away from the delivery vehicle 4, as shown in FIG. 22M, and generally parallel to the ground or some other supporting surface S. The operator will then typically actuate the first and/or second lifting members 26, e.g., the track hydraulic cylinders, to lower the second end of the curved generally U-shaped guide track 10 and the supported item(s) to be delivered 54 toward, or possibly in contact with, the ground or some other supporting surface S (see FIG. 22N). In addition, the operator may possible actuate the platform hydraulic cylinder(s) 50 to move the fork(s) 22 so that each fork(s) 22 forms an angle of slightly greater than 90 degree with respect to the fork platform 20 and this will create an angle of inclination which assists with a sliding release of the supported item(s) to be delivered 54 from the fork(s) 22 onto the ground, or some other supporting surface S.

Lastly, the operator again actuates the at least one nested track cylinder(s) 32 to move and retract the second end of the curved generally U-shaped guide track 10 and the fork(s) 22 away from and out of engagement with the delivered item(s) and toward the delivery vehicle 4 (see FIG. 22O). As this occurs, the item(s) to be delivered 54 is gradually transferred from being supported solely by the fork(s) 22 to being supported solely by the ground, or some other supporting surface S. If necessary, the operator may again actuate the first and/or second lifting members 26, e.g., the track hydraulic cylinders, to raise the second end of the curved generally U-shaped guide track 10 so that the curved generally U-shaped guide track 10 is generally parallel to a top surface of the vehicle bed 28 and operate the drive motor 24 to reposition the movable trolley 18 back into the position shown in FIG. 22B or FIG. 22A, for either unloading another item(s) to be delivered 54 or for transportation of the delivery vehicle 4 to either another delivery location, to deliver another item(s) to be delivered 54, or back to the loading facility for retrieval of another load of item(s) to be delivered 54.

In order to retrieve an item(s) to be delivered 54 from the ground, or other supporting surface at a desired location and, thereafter, load the same on the vehicle bed 28 of the delivery vehicle 4 for transport to a delivery location, the above procedure is merely undertaken in the reverse order. That is, the starting with the loading/unloading device(s) 2 located as shown in FIG. 22O, the operator will then actuate the at least one nested track cylinder(s) 32 to move and extend the second end of the curved generally U-shaped guide track 10 and the fork(s) 22 toward and into engagement with the item(s) to be delivered 54 and away from the delivery vehicle 4 (see FIG. 22N) to engage and support the item(s) to be delivered 54. Once the item(s) to be delivered 54 is supported by the fork(s), the above process is then repeated in the reverse order (FIG. 22M to FIG. 22A) to load the item(s) to be delivered 54 onto the vehicle bed 28 of the delivery vehicle 4.

It is to be appreciated that a conventional source of hydraulic fluid H or a source of electrical power is provided for supplying, either hydraulic fluid or electrical, power to each of the drive motor 24, the track hydraulic cylinders 26, first nested track cylinder 32, the second nested track cylinder 34, the hydraulic platform motor 46, the platform hydraulic cylinder(s) 50 and the fork hydraulic cylinder(s).

Turning now to FIGS. 23A-25B, a second embodiment of the present invention will now be described. As this embodiment is very similar to the previously discussed embodiment, only the differences between this second embodiment and the first embodiment will be discussed in detail while identical elements will be given identical reference numerals.

The primary differences between the second embodiment and the first embodiment relates to the modification of the drive mechanism for driving the trolley 18 and the item(s) to be delivered 54 to and fro along the curved generally U-shaped guide track 10. More specifically, the drive motor 24 is replaced with first and second cable hydraulic cylinders 80, 82, which work in tandem with one another. In addition, the chain, wire or some other conventional drive member 56 is replaced by respective first and second cables 84, 86, associated with the first and the second cable hydraulic cylinders 80, 82. Further, a lower most second end 112 of the second section of the curved generally U-shaped guide track 10 is pivotable, by a hydraulic guide track cylinder 88, from a use position (see FIG. 24A) into a stowed position (see FIG. 25B), and vice versa, to facilitate both use of the loading/unloading device(s) 2 as well as travel of the delivery vehicle 4 from one location to another. The first and the second cable hydraulic cylinders 80, 82, the plurality of pulleys and the first and the second cables 84, 86 together form the drive assembly for the trolley 18.

Figure 23A:
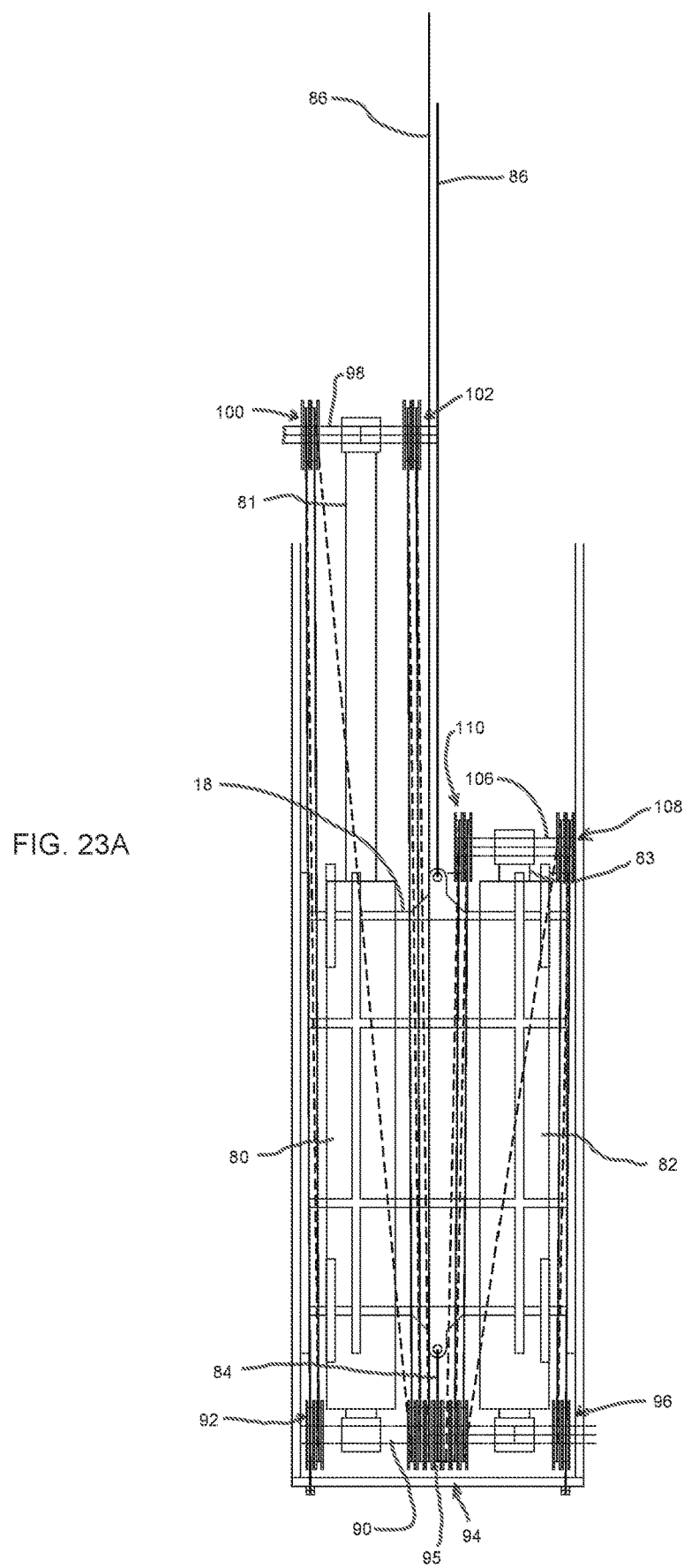
FIG. 23A is a diagrammatic bottom plan view showing a second embodiment, including first and second cable hydraulic cylinders and first and second cables each having a first end affixed to the vehicle frame and an opposite end affixed to one end of the trolley, for inducing movement of the trolley and the item(s) to be delivered along the curved generally U-shaped guide track, with the first cable hydraulic cylinder shown in its maximum extended position and the second cable hydraulic cylinder shown in its minimal retracted position so that the trolley is positioned closely adjacent the closed end of the respective loading/unloading channel.

As shown in FIGS. 23A and 23B, the first and the second cable hydraulic cylinders 80, 82, which work in tandem with one another, comprise the drive mechanism for conveying the trolley 18 and the item(s) to be delivered 54 to and fro along the curved generally U-shaped guide track 10. It is to be appreciated that the overall size, shape and displacement of the first and second cable hydraulic cylinders 80, 82 can be increased or decreased depending upon the size, weight, shape, etc., of the item(s) to be delivered 54. The first cable 84, e.g., typically between a ⅛ to a ¾ inch cable and more preferably about 7/16 of an inch cable, is associated with the first cable hydraulic cylinder 80 while a second cable 86, e.g., also typically between a ⅛ to a ¾ inch cable and more preferably about 7/16 of an inch cable, is associated with the second cable hydraulic cylinder 82. Each of the first and the second cable hydraulic cylinders, 80, 82 are supported by a lower surface of the curved generally U-shaped guide track 10 so as to be movable therewith, as described above.

As shown in FIGS. 23A and 23B, a base rod 90, e.g., 1±0.5 inch shaft, is fixedly secured to a first side of the lower support surface of the first end of the curved generally U-shaped guide track 10. A base of a housing of the first cable hydraulic cylinder 80 is supported on the base rod 90 adjacent the first side of the lower support surface. As generally shown, the base rod 90 passes through a through bore provided in the base of the housing of the first cable hydraulic cylinder 80. A first pair of pulleys 92, e.g., each a 4±2 inch diameter pulley, are also rotatably supported on the base rod 90, between the base of the housing of the first cable hydraulic cylinder 80 and the first side of the lower support surface of the first end of the curved generally U-shaped guide track 10. A set of six pulleys 94, e.g., each a 4±2 inch diameter pulley, are rotatably supported on the base rod 90, between the housing of the first cable hydraulic cylinder 80 and a housing of the second cable hydraulic cylinder 82. As discussed in further detail below, a first three of the set of six pulleys 94 cooperate with the first cable hydraulic cylinder 80 while the fourth, fifth and sixth pulleys, of the set of six pulleys 94, cooperate with the second cable hydraulic cylinder 82.

An alignment pulley 95 is located vertically above the set of six pulleys 94, see FIG. 23A for example. The alignment pulley 95 cooperates with the first cable 84 and the first cable hydraulic cylinder 80, as discussed below in further detail, to assist with coupling the second end of the first cable 84 to the trolley 18. A second pair of pulleys 96, e.g., each a 4±2 inch diameter pulley, are rotatably supported on the base rod 90, between the housing of the second cable hydraulic cylinder 82 and a second opposite side of the lower surface of the first end of the curved generally U-shaped guide track 10.

A first arm rod 98, e.g., a 1±0.5 inch shaft, is fixedly secured to the remote free end of the cylinder arm of the first cable hydraulic cylinder 80, as shown in FIGS. 23A and 23B, and this first arm rod 98 extends perpendicular to the piston shaft 81 of the first cable hydraulic cylinder 80. A third pair of pulleys 100, e.g., each a 4±2 inch diameter pulley, is rotatably supported on the first arm rod 98, between the remote free end of the piston shaft 81 of the first cable hydraulic cylinder 80 and the first side of the lower support surface of the first end of the curved generally U-shaped guide track 10. In addition, a fourth pair of pulleys 102, e.g., each a 4±2 inch diameter pulley, is rotatably supported on the first arm rod 98, on the opposite side of the remote free end of the piston shaft 81 of the first cable hydraulic cylinder 80. A first guide 104 is provided for permitting to and fro movement of the piston shaft 81 and the first arm rod 98 while preventing rotation of the piston shaft 81 of the first cable hydraulic cylinder 80, as that the piston shaft 81 extends and retracts relative to the base of the first cable hydraulic cylinder 80.

A second arm rod 106, e.g., a 1±0.5 inch shaft, is fixedly secured to the remote free end of the piston shaft 83 of the second cable hydraulic cylinder 82, as shown in FIGS. 23A and 23B. A sixth pair of pulleys 108, e.g., each a 4=2 inch diameter pulley, is rotatably supported on the second arm rod 106, between the remote free end of the piston shaft 83 of the second cable hydraulic cylinder 82 and the second side of the lower support surface of the first end of the curved generally U-shaped guide track 10. In addition, a fifth pair of pulleys 110, e.g., each a 4±2 inch diameter pulley, is rotatably supported on the second arm rod 106, on the opposite side of the remote free end of the piston shaft 83 of the second cable hydraulic cylinder 82. A second guide 108 is provided for permitting to and fro movement of the remote free end of the piston shaft 83 and the second arm rod 106 while preventing rotation of the piston shaft 83 of the second cable hydraulic cylinder 82, as that the remote free end of the piston shaft 83 extends and retracts relative to the base of the second hydraulic cylinder.

The first end of the first cable 84 is securely affixed to the first end of the curved generally U-shaped guide track 10 and then partially wraps around a first pulley of the first pair of pulleys 92. The first cable 84 then wraps around a first pulley of the third pair of pulleys 100 and subsequently wraps around a second pulley of the first pair of pulleys 92. The first cable 84 then wraps around a second pulley of the third pair of pulleys 100 and then subsequently extends across a portion of the first cable hydraulic cylinder 80 and wraps around a first pulley of the set of six pulleys 94. The first cable 84 then wraps around a first pulley of the fourth pair of pulleys 102 and subsequently wraps around a second pulley of the set of six pulleys 94. The first cable 84 then wraps around a second pulley of the fourth pair of pulleys 102 and subsequently wraps around a third pulley of the set of six pulleys 94. Thereafter, the first cable 84 then travels vertically upward, a small distance, and wraps partially around the alignment pulley 95, (see FIG. 24A for example) which is rotatably supported and generally centered between the sidewalls of the curved generally U-shaped guide track 10. Finally, the second end of the first cable 84 extends from the alignment pulley 95 and is fixedly connected to a first end of the trolley 18. The alignment pulley 95 assists with exerting a pulling force, on the trolley 18, which is generally parallel to a longitudinal direction of the straight first section 12 of the curved generally U-shaped guide track 10. In FIG. 23A, the first cable hydraulic cylinder 80 is shown in its fully extended position.

The first end of the second cable 86 is securely affixed to the lower support surface of the first end of the curved generally U-shaped guide track 10 and then partially wraps around a first pulley of the second pair of pulleys 96. The second cable 86 then wraps around a first pulley of the sixth pair of pulleys 108 and subsequently wraps around a second pulley of the second pair of pulleys 96. The second cable 86 then wraps around a second pulley of the sixth pair of pulleys 108 and crosses over a portion of the second cable hydraulic cylinder 82 and subsequently wraps around the sixth pulley of the set of six pulleys 94. The second cable 86 then wraps around a first pulley of the fifth pair of pulleys 110 and subsequently wraps around the fifth pulley of the set of six pulleys 94. The second cable 86 then wraps around a second pulley of the sixth pair of pulleys 108 and subsequently wraps around the fourth pulley of the set of six pulleys 94. The second cable 86 then extends along, below and parallel to the first section of the curved generally U-shaped guide track 10 toward the second end of the curved generally U-shaped guide track 10. The second cable 86 is periodically supported by a number of guide rollers or pulleys 66' located between the second cable hydraulic cylinder 82 and a return pulley 60'. The second cable 86 then wraps around the return pulley 60' and extends back to the trolley 18 where the second end of the second cable 86 is then fixedly connected to an opposed second end of the trolley 18. In FIG. 23A, the second cable hydraulic cylinder 82 is shown in its fully retracted position.

It is to be appreciated that each one of the above described pulleys is supported on the base rod 90, the first arm rod 98 or the second arm rod 106 by a respective bushing (not shown in detail) which facilitates rotation of the respective pulley with respect to the base rod 90, the first arm rod 98 or the second arm rod 106.

FIG. 23B shows the first cable hydraulic cylinder 80 actuated into its fully retracted position in which a maximum amount of the first cable 84 is dispensed from the first, the third, the fourth and the first three pulleys of the set of six pulleys 94, while the second cable hydraulic cylinder 82 is actuated into its fully extended position in which a maximum amount of the second cable 86 is absorbed and wraps around the second, fifth, sixth pulleys and the fourth, fifth and sixth pulleys of the set of six pulleys 94. As a result of this configuration, the first and the second cable hydraulic cylinders 80, 82 cooperate with one another to move the trolley 18 into its end position located closely adjacent the second end of the curved generally U-shaped guide track 10. That is, the first cable hydraulic cylinder 80 is in its fully retracted position so that a maximum amount of the first cable 84 is dispensed from the first, the third, the fourth pulleys and the first three pulleys of the set of six pulleys 94 while the second cable hydraulic cylinder 82 is in its fully extended position in which a maximum amount of the second cable 86 is absorbed by the second, fifth, sixth and the fourth, fifth and sixth pulleys of the set of six pulleys 94, as shown in FIG. 23A.

Typically, the first and the second cable hydraulic cylinders 80, 82 are hydraulic coupled with one another so that they work in tandem with one another, i.e., each cable hydraulic cylinder is actuated substantially the same in an opposite direction. That is, when the first cable hydraulic cylinder 80 is extended or retracted by 1 inch, the second cable hydraulic cylinder 82 is correspondingly retracted or extended by 1 inch. If the second cable hydraulic cylinder 82 is extended or retracted by 8 inches, then the first cable hydraulic cylinder 80 is corresponding retracted or extended by 8 inches, etc. Such arrangement ensured that both the first and the second cables 84, 86 remain generally under tension so s to facilitate precise movement of the trolley 18 and the item(s) to be delivered 54 along the curved generally U-shaped guide track 10. Typically, each one of the first and the second cable hydraulic cylinders 80, 82 has a range of motion of about 15±8 inches or so and can dispense or and absorb about 180±60 inches of cable over such range of motion.

During operation, the first and the second cable hydraulic cylinders 80, 82 are actuated, by the hydraulic system, in order to move the trolley 18 and the supported item(s) to be delivered 54 along the curved generally U-shaped guide track 10. As with the prior embodiment, the curved generally U-shaped guide track 10 is surrounded by the inner and the outer nested tracks 6, 8. In addition, the lifting members 26 are arranged to lift and manipulate the inner and outer nested tracks 6, 8, the curved generally U-shaped guide track 10, the first and the second cable hydraulic cylinders 80, 82, the fork platform 20, the fork(s) 22 as well as the item(s) to be delivered 54 (see FIG. 22G) as previously discussed for delivering or retrieving the supported item(s) to be delivered 54.

Figure 24A:
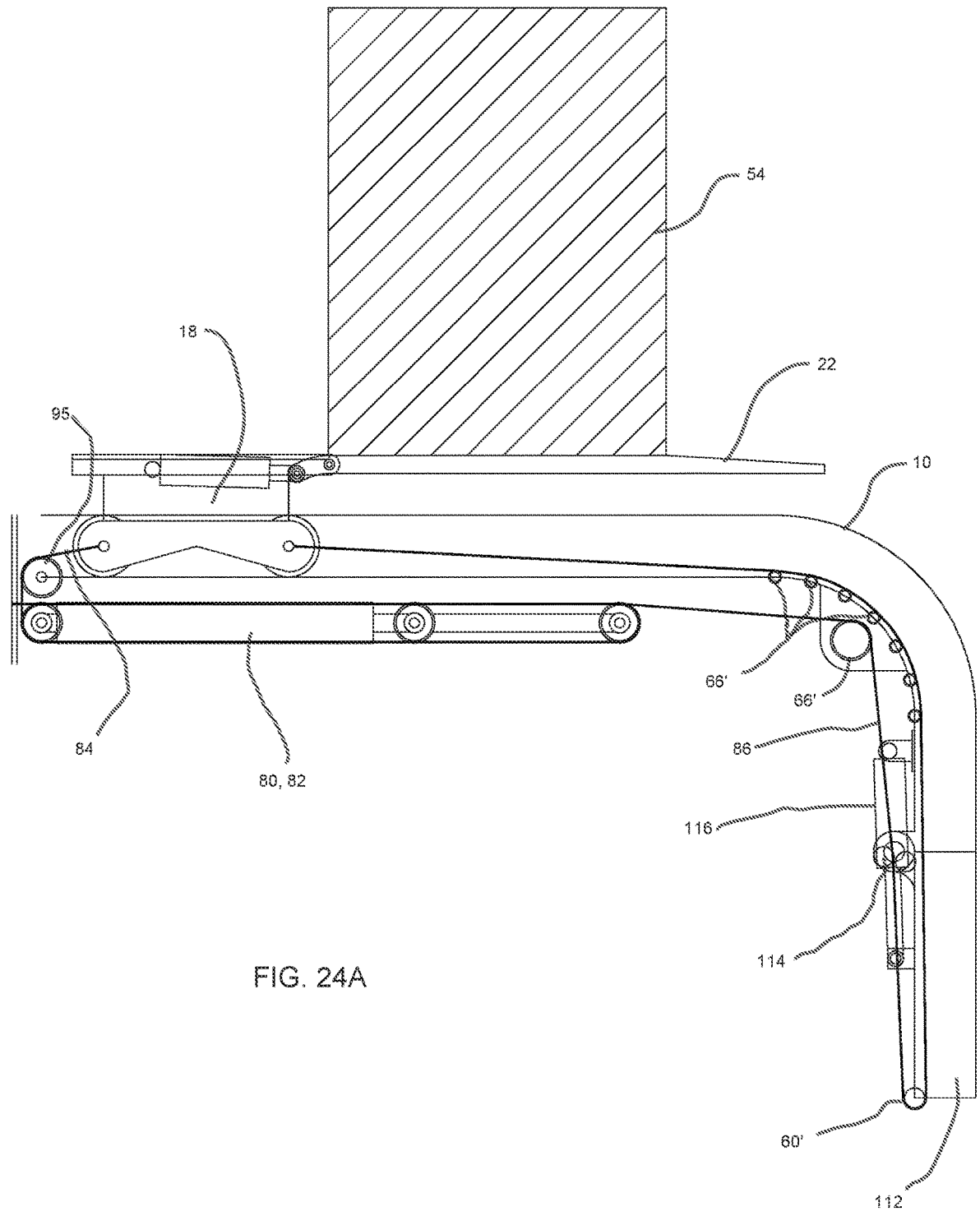
FIG. 24A is a diagrammatically cross sectional view showing the trolley located in a position closely adjacent the closed end of the respective loading/unloading channel with the forks of the electric/hydraulic loading/unloading device engaged with and lifting the item(s) to be delivered lifted off the vehicle bed.
Figure 24B:
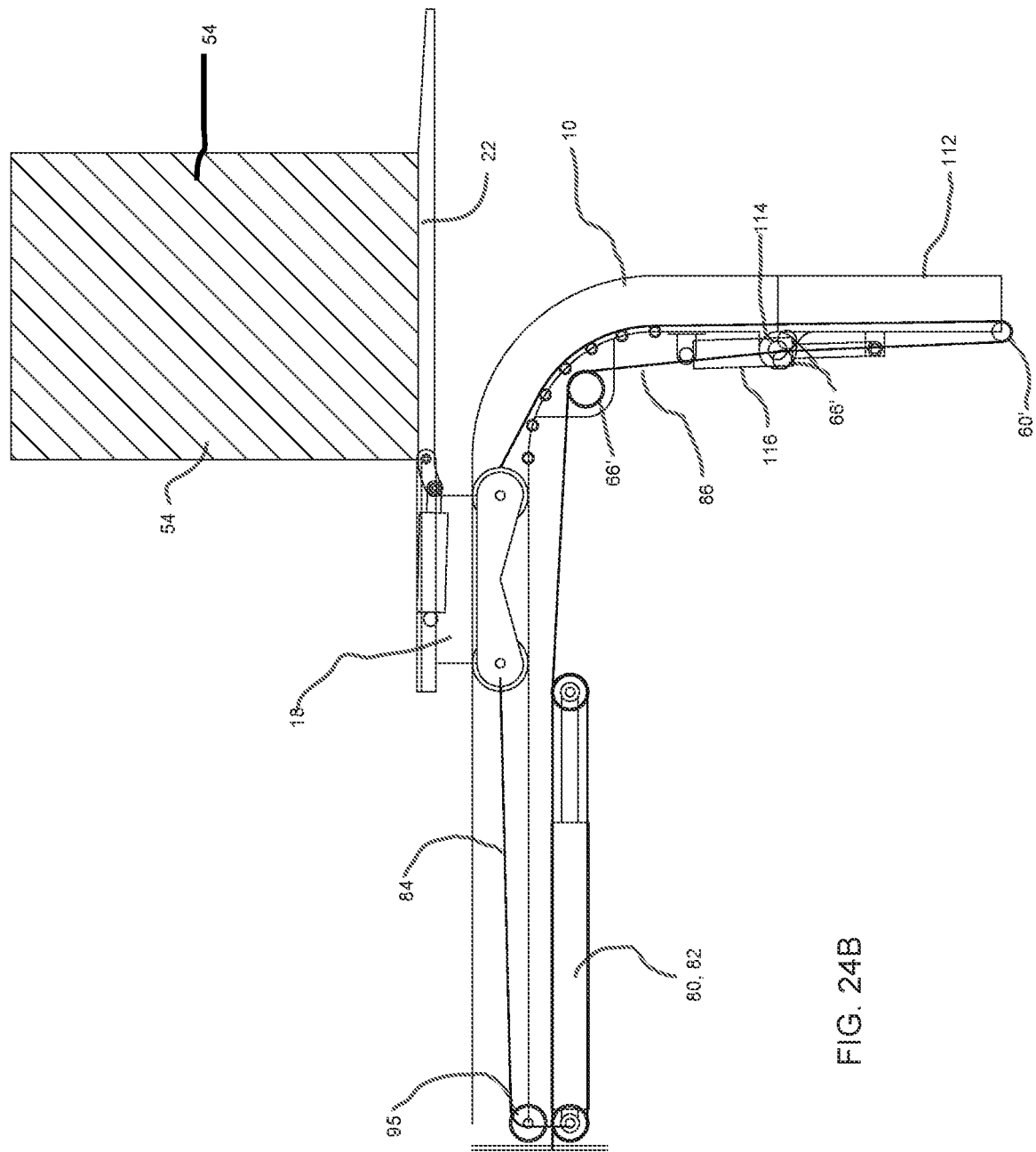
FIG. 24B is a diagrammatically cross sectional view showing movement of the trolley and the item(s) to be delivered partially along the curved generally U-shaped guide track toward the curved section of the curved generally U-shaped guide track.
Figure 24C:
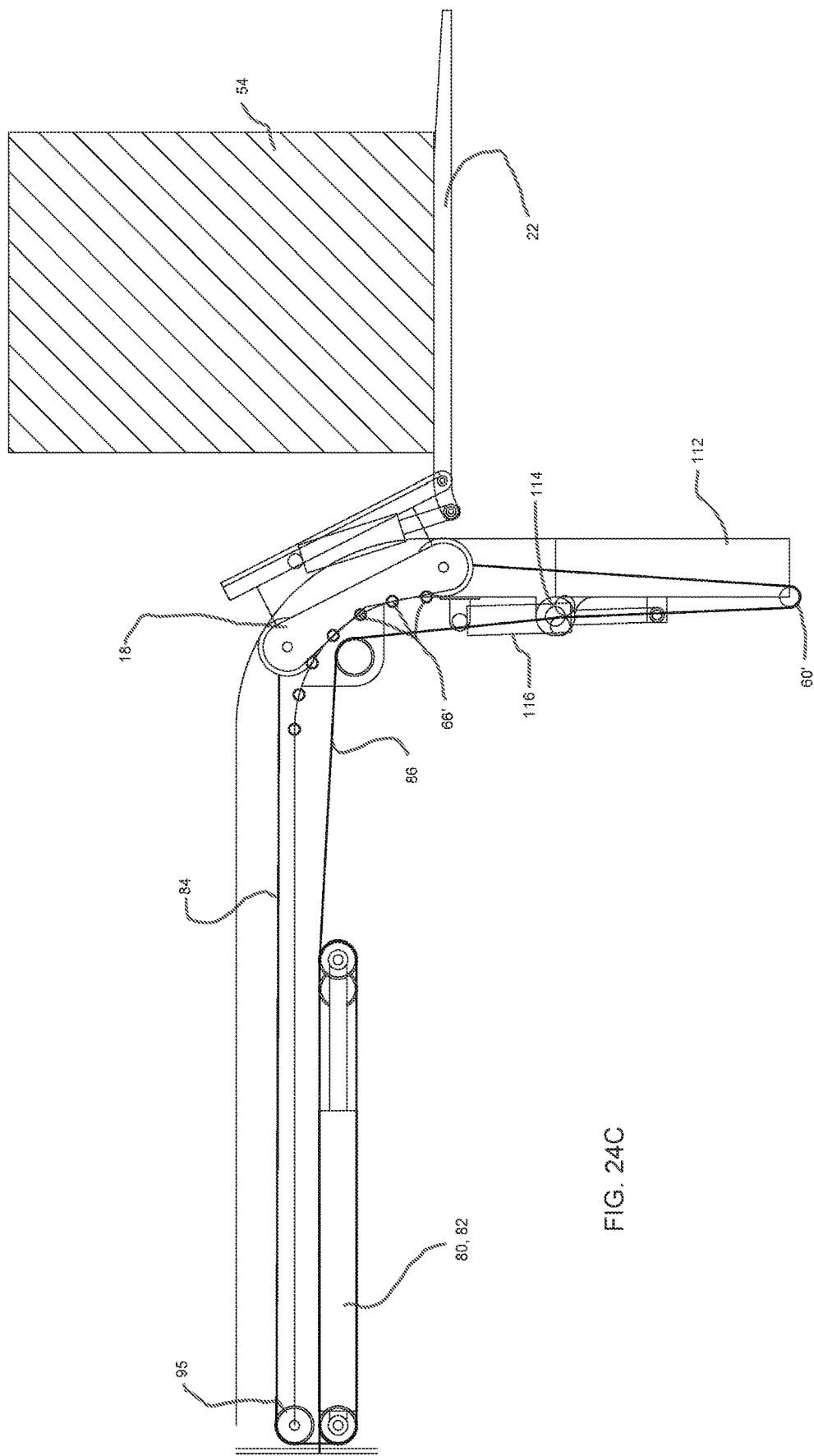
FIG. 24C is a diagrammatically cross sectional view showing further movement of the movable trolley along the curved section, of the curved generally U-shaped guide track, with the fork(s) being moved, relative to the fork platform, so as to maintain the item(s) to be delivered in a substantially vertical orientation.
Figure 24D:
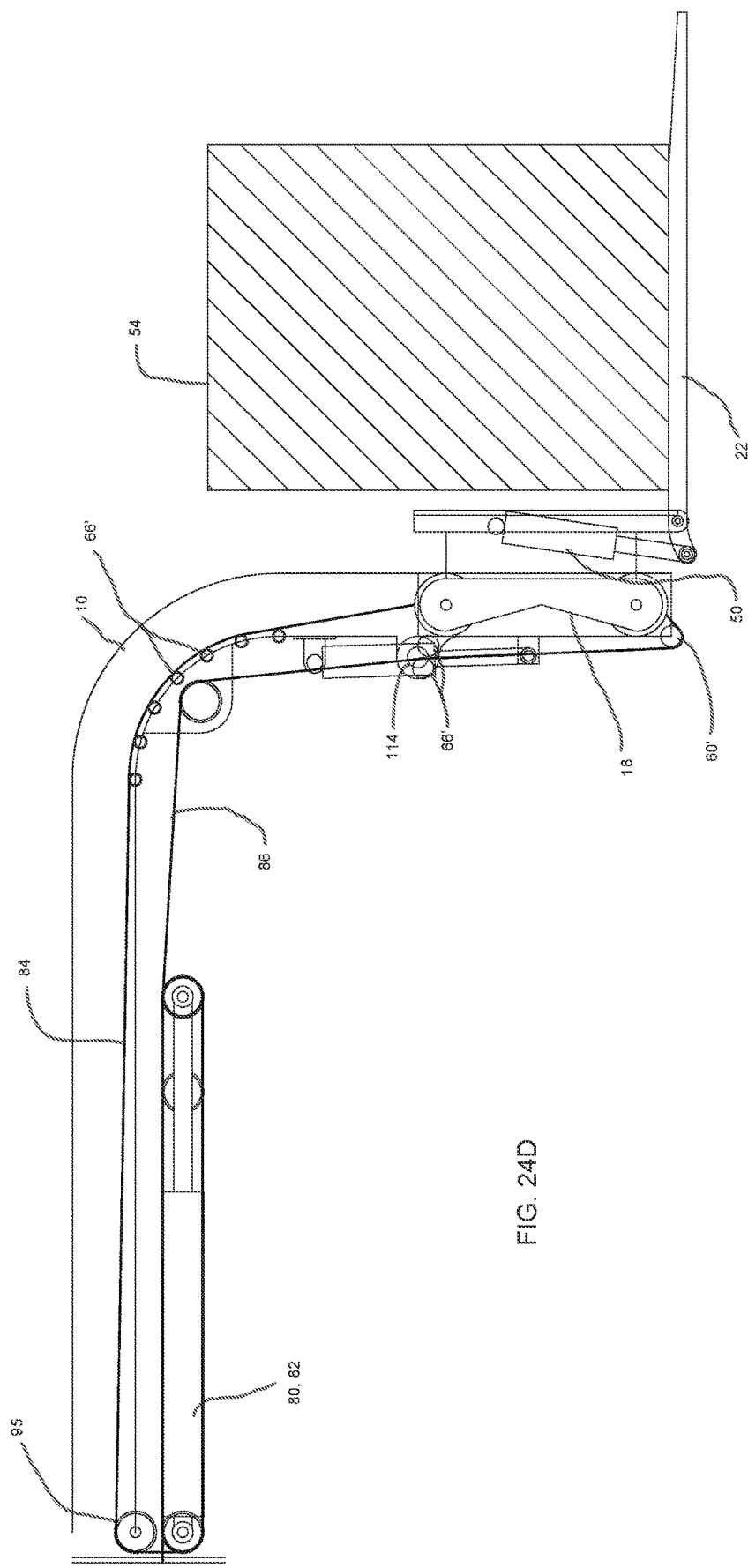
FIG. 24D is a diagrammatically cross sectional view showing movement of the movable trolley, the fork(s) of the electric/hydraulic loading/unloading device and the item(s) to be delivered generally located at the second end the curved generally U-shaped guide track with the fork(s) now extending substantially perpendicular to the fork platform.
Figure 25A:
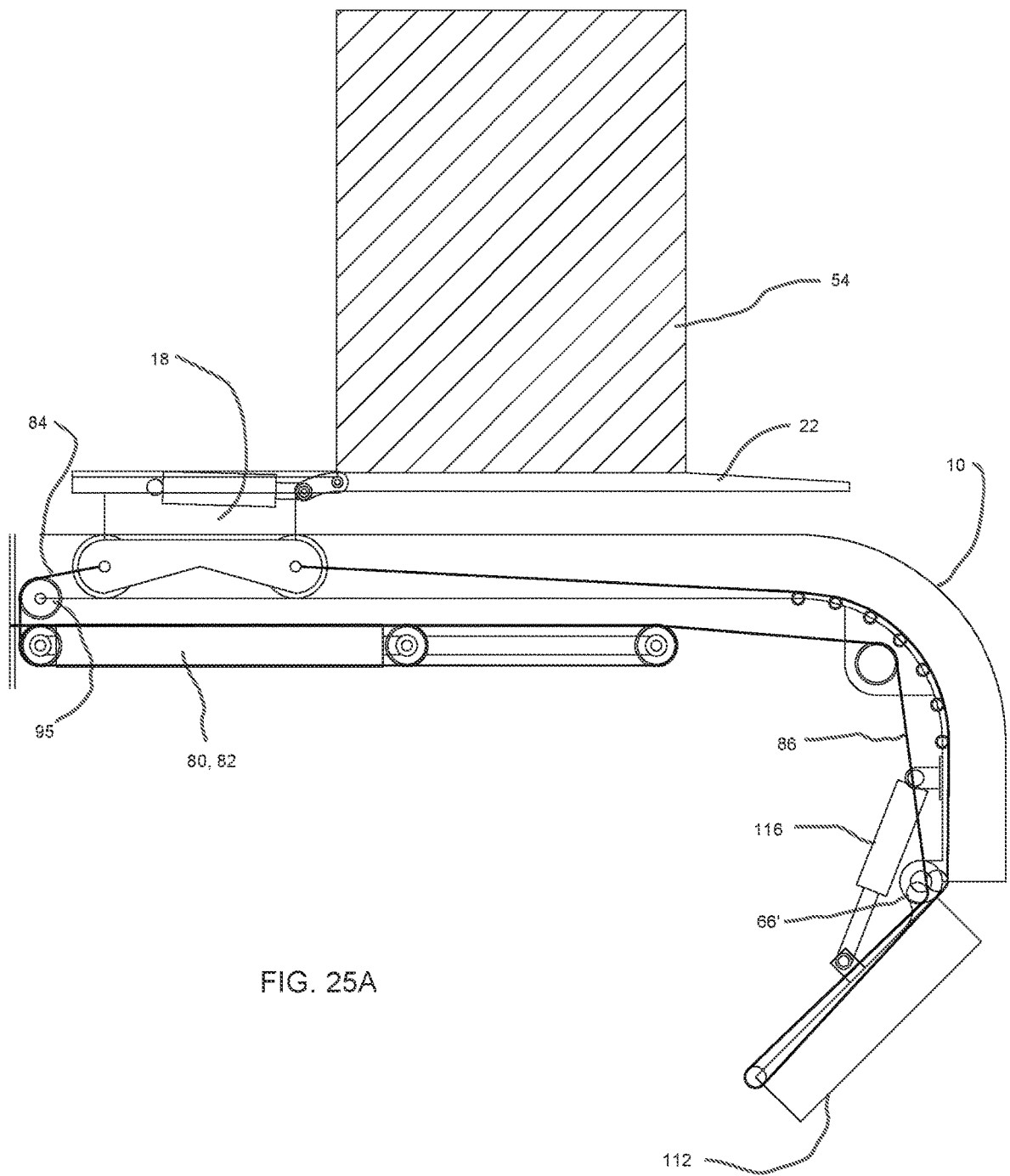
FIG. 25A is a diagrammatically cross sectional view, similar to FIG. 24A, following partial actuation of a guide track cylinder to induce pivoting movement of a lower most second end of the second section of the curved generally U-shaped guide track, relative to a remainder of the curved generally U-shaped guide track, into a stowed position.

According to the second embodiment, as shown in FIGS. 24A, 25A and 25B, a lower most second end 112 of the curved generally U-shaped guide track 10 is pivotable connected to a remainder of the curved generally U-shaped guide track 10 by a track hinge 114. That is, the track hinge 114 is fixedly secured to both a rear surface of the lower most second end 112 of the curved generally U-shaped guide track 10 as well as a rear surface of a lower portion of a remainder of the curved generally U-shaped guide track 10. The track hinge 114 facilitates pivoting movement of the lower most second end 112, of the curved generally U-shaped guide track 10, relative to the remainder of the curved generally U-shaped guide track 10 about an axis defined by the track hinge 114, from its use position, shown in FIG. 24A, though its intermediate position, shown in FIG. 25A, and into is stowed position, shown in FIG. 25B, and vice versa.

A track hydraulic cylinder 116 has a first end (e.g., a piston end) pivotably attached, via a first bracket (not separately labeled), to the rear surface of the lower most second end 112 of the curved generally U-shaped guide track 10 while the second end (e.g., the cylinder housing end) is pivotably attached, via a second bracket (not separately labeled), to the rear surface of the lower portion of the remainder of the curved generally U-shaped guide track 10, closely adjacent the track hinge 114. When hydraulic fluid is supplied from the hydraulic source to a first end of the track hydraulic cylinder 116, the overall axial length of the track hydraulic cylinder 116 increases to is maximum length. This causes the lower most second end 112, of the curved generally U-shaped guide track 10, to pivot about the track hinge 114, relative to the remainder of the curved generally U-shaped guide track 10, from its stowed position, shown in FIG. 25B, into its use position, shown in FIG. 24A. Alternatively, when hydraulic fluid is supplied from the hydraulic source to a second end of the track hydraulic cylinder 116, the overall axial length of the track hydraulic cylinder decreases to is minimum length. This causes the lower most second end 112, of the curved generally U-shaped guide track 10, to pivot about the track hinge 114 in an opposite direction, relative to the remainder of the curved generally U-shaped guide track 10, from its use position, shown in FIG. 24A, into its stowed position, shown in FIG. 25B.

The stowed position provides additional ground clearance for the curved generally U-shaped guide track 10. Such increased ground clearance assists with travel of the delivery vehicle 4, from one location to another, without the lower most second end 112 of the curved generally U-shaped guide track 10 inadvertently engaging with the ground, the roadway, an object, etc., during movement of the delivery vehicle 4.

As diagrammatically show, a plurality of spaced apart and sequentially arranged guide rollers or pulleys 66' are provided along the rear surface of the curved generally U-shaped guide track 10 for guiding the second cable 86. In addition, the track hinge 114 also includes at least one guide roller or pulley 66' for guiding the second cable 86 relative to the track hinge 114 and during pivoting movement of the lower most second end 112 of the curved generally U-shaped guide track 10. As with the first embodiment, a plurality of guide rollers or pulleys 66' are also provided along the curved section 16 to assist with guiding of a section of the first cable 84 or the second cable 86, as the trolley 18 is conveyed toward the second end of the curved generally U-shaped guide track 10, or to assist with guiding of a section of the first cable 84 or the second cable 86, as the trolley 18 is conveyed toward the first end of the curved generally U-shaped guide track 10. The guide rollers or pulleys 66' prevent the first and the second cables 84, 86 from becoming bound, jammed or otherwise generating significant friction during operation.

It is to be appreciated that when the lower most second end 112 of the curved generally U-shaped guide track 10 pivots, relative to the remainder of the curved generally U-shaped guide track 10, from its use position, shown in FIG. 24A, into its stowed position, shown in FIG. 25B, an addition length, e.g., typically about 9±6 inches, of one of the first and the second cables 84, 86 (e.g., the second cable 86) must be dispensed from one of the first and/or the second cable hydraulic cylinders 80, 82 (e.g., the second hydraulic cylinder) in order to facilitate such pivoting movement. That is, when hydraulic fluid is supplied from the hydraulic source to a second end of the track hydraulic cylinder 116, so as to decrease the overall axial length of the track hydraulic cylinder 116 into is minimum length, hydraulic fluid is also supplied from the hydraulic source to the second cable hydraulic cylinder 82 so as to decreases the axial length thereof and dispense an additional length of the second cable 86 therefrom and thereby provide sufficient slack in the cables 84, 86 so as to permit such pivoting movement.

Conversely, when the lower most second end 112, of the curved generally U-shaped guide track 10, pivots, relative to the remainder of the curved generally U-shaped guide track 10, from its stowed position, shown in FIG. 25B, into its use position, shown in FIG. 24A, an addition length, e.g., typically about 9±6 inches, of one of the first and/or the second cables 84, 86 (e.g., the second cable 86) must be absorbed by one of the first and/or the second cable hydraulic cylinders 80, 82 (e.g., the second hydraulic cylinder), in order to facilitate such pivoting movement and avoid the first and the second cables 84, 86 from becoming entangled, bound, disengaging from the plurality of guide rollers or pulleys 66', etc. That is, when hydraulic fluid is supplied from the hydraulic source to a first end of the track hydraulic cylinder 116, so as to increase the overall axial length of the track hydraulic cylinder 116 to is maximum length, hydraulic fluid is also supplied from the hydraulic source to the second cable hydraulic cylinder 82 so as to increases the axial length thereof and absorb an additional length of the second cable 86 and thereby maintain sufficient tension of the first and second cables 84, 86 during such pivoting movement.

While the above description discusses a nine pulleys associated with each one of the first and the second cable hydraulic cylinders 80, 82, it is to be appreciated that the total number pulleys, associated with each one of the first and the second cable hydraulic cylinders 80, 82, can vary from application to application. For example, if a particular application requires an additional length of (e.g., first and second) cable 84, 86 to be dispensed/absorbed by the associated cable hydraulic cylinders 80, 82, then the total number of associated pulleys can be increased to more than nine pulleys. Alternatively, if the particular application requires a lesser length of (e.g., first and second) cable 84, 86 to be dispensed/absorbed by the associated cable hydraulic cylinder 80, 82, then the total number of associated pulleys can be decreased for such application to less than nine pulleys.

Alternatively, or in combination with the pulley modification, it is to be appreciated that the overall stoke length of each one of the cable hydraulic cylinders 80, 82 may be increased if the particular application requires an additional length of (e.g., first and second) cable 84, 86 to be dispensed/absorbed by the associated cable hydraulic cylinders 80, 82. Alternatively, if the particular application requires a lesser length of (e.g., first and second) cable 84, 86 to be dispensed/absorbed by the associated cable hydraulic cylinders 80, 82, then the overall stoke length of each of the cable hydraulic cylinders 80, 82 can be decreased for such application.

For more robust applications, it is to be appreciated the diameter of the first and the second cables 84, 86 as well as the diameter and the width of the associated pulleys, of the first and the second cable hydraulic cylinders 80, 82, may be increased in order to facilitate lifting heavier loads and thereby accommodate increased strains while minimizing any binding, twisting, jamming, etc., of the first and the second cables 84, 86 during operation. For less robust applications, if desired, the diameter of the first and second cables 84, 86 as well as the width and/or the diameter of the associated pulleys, of the first and the second cable hydraulic cylinders 80, 82, can be decreased.

In summation, depending upon the particular application, it is to be appreciated that the overall size, the stoke length and the load transmission capabilities of each of the first and the second cable hydraulic cylinders 80, 82 can vary from one application to another. In addition, the overall size and the diameter of the first and the second cables 84, 86 and the associated pulleys can also vary from one application to another. As such, it is to be appreciated that the above embodiment is by way of example only and not intended to limit, in any way, the disclosure of this invention.

It is to be noted that the above description makes reference to a hydraulic motor, by way of example only, for generating hydraulic pressure and operating the various components. It is to be appreciated that a conventional pressurized air system could be utilized instead of the hydraulic pressure system. The conventional pressurized air system could, for example, supply pressurized air, instead of hydraulic fluid, to each one of the first and the second cable hydraulic cylinders 80, 82 in order to control movement thereof. Alternatively, the conventional pressurized air system could supply pressurized air as an input for driving a hydraulic pump which, in turn, would then generate hydraulic fluid as an output therefrom. Such generated hydraulic fluid can then be utilized to control operation of first and the second cable hydraulic cylinders 80, 82, etc., as described above.

While various embodiments of the present disclosure have been described in detail, it is apparent that various modifications and alterations of those embodiments will occur to and be readily apparent to those skilled in the art. However, it is to be expressly understood that such modifications and alterations are within the scope and spirit of the present disclosure, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

Wherefore, I claim:

1. A loading/unloading device for delivering an item(s) to be delivered, the loading/unloading device comprising:
   an outer nested track;
   an inner nested track being nested within the outer nested track;
   a curved generally U-shaped guide track being nested within the inner nested track;
   a movable trolley being accommodated and movable along the curved generally U-shaped guide track; and
   a drive assembly being supported by a first end of the curved generally U-shaped guide track for conveying the movable trolley back and forth along the curved generally U-shaped guide track, and the movable trolley facilitates loading and unloading the item(s) to be delivered, wherein at least first and second lifting members are provided for raising and lowering the outer nested track, the inner nested track, the curved generally U-shaped guide track and the movable trolley relative to a vehicle bed of a delivery vehicle.

2. The loading/unloading device according to claim 1, wherein the movable trolley supports a fork platform and the fork platform supports at least one pivotable fork to assist with loading and unloading the item(s) to be delivered.

3. The loading/unloading device according to claim 1, wherein the outer nested track surrounds at least a first end of the inner nested track and at least one needle bearing is located therebetween to facilitate sliding movement of the outer nested track relative to the inner nested track, and the inner nested track surrounds at least a first end of the curved generally U-shaped guide track and at least one needle bearing is located therebetween to facilitate sliding movement of the inner nested track relative to the curved generally U-shaped guide track.

4. The loading/unloading device according to claim 1, wherein the first lifting member is connected between a vehicle frame or body of the delivery vehicle and a first end of the outer nested track while the second lifting member is connected between the vehicle frame or body and a second end of the outer nested track.

5. The loading/unloading device according to claim 1, wherein the movable trolley comprises a shuttle base frame which supports spaced apart first and second pairs of rotatable wheels, and each rotatable wheel has an annular recess formed therein which matingly engages with a guide rail, supported by the curved generally U-shaped guide track, to facilitate guided travel of the movable trolley within and along the curved generally U-shaped guide track.

6. The loading/unloading device according to claim 1, wherein the fork platform supports two forks adjacent a second end thereof, a respective platform hydraulic cylinder controls pivoting motion of each respective fork, relative to the fork platform, so that each fork is movable from a position generally perpendicular to the fork platform to a position generally parallel to the fork platform to facilitate loading and unloading of the item(s) to be delivered.

7. The loading/unloading device according to claim 6, wherein each fork has a respective fork hydraulic cylinder for controlling an overall axial length of each fork so that each respective fork is movable from an extended position to a retracted position for supporting an item(s) to be delivered and vice versa.

8. The loading/unloading device according to claim 1, wherein a first end of a drive member of the drive assembly is connected to a first end of the movable trolley while a second end of the drive member of the drive assembly is connected to an opposite second end of the movable trolley and the drive member is coupled to the drive motor to facilitate conveying the movable trolley back and forth along the curved generally U-shaped guide track.

9. The loading/unloading device according to claim 8, wherein a first intermediate section of the drive member drivingly engages with a drive sprocket, supported by the drive motor, while a second intermediate section of the drive member engages with a return sprocket, rotatably supported adjacent the second end of the curved generally U-shaped guide track, and an idler sprocket is located adjacent the drive sprocket to direct the drive member along a track guide, formed along a lower portion of the curved generally U-shaped guide track and extending between the idler sprocket and the return sprocket.

10. The loading/unloading device according to claim 9, wherein a plurality of rollers extend between opposed sides of a curved section of the curved generally U-shaped guide track for supporting and guiding the drive member and minimizing friction as the drive member moves to and fro relative to the curved section of the curved generally U-shaped guide track.

11. The loading/unloading device according to claim 1, wherein the curved generally U-shaped guide track comprises a substantially straight first section located at the first end thereof, a substantially straight second section located at a second end thereof and a curved section located between the first and second sections.

12. The loading/unloading device according to claim 1, wherein the inner nested track is located between the curved generally U-shaped guide track and the outer nested track so as to permit sliding relative movement between the curved generally U-shaped guide track and the outer nested track.

13. The loading/unloading device according to claim 1, wherein a control system controls operation of the loading/unloading device so that each of two forks is gradually moved from a perpendicular position, relative to the fork platform, to a parallel position, relative to the fork platform and the item(s) to be delivered remains constantly in a substantially vertical orientation.

14. The loading/unloading device according to claim 1, wherein the drive assembly comprises a first cable hydraulic cylinder having a first cable and associated pulleys and a second cable hydraulic cylinder having a second cable and associated pulleys, one end of the first cable is connected to a first end of the movable trolley and one end of the second cable is connected to a second, opposite end of the movable trolley, and expansion of the first cable hydraulic cylinder and contraction of the second cable hydraulic cylinder causing the movable trolley to move in a first direction along the curved generally U-shaped guide track while and contraction of the first cable hydraulic cylinder and expansion of the second cable hydraulic cylinder causing the movable trolley to move in a second opposite direction along the curved generally U-shaped guide track.

15. The loading/unloading device according to claim 1, wherein a lower most second end of the curved generally U-shaped guide track is pivotable, relative to a remainder of the curved generally U-shaped guide track, from a use position into a stowed position and vice versa.

16. A loading/unloading device for delivering an item(s) to be delivered, the loading/unloading device comprising:
an outer nested track;
an inner nested track being nested within the outer nested track;
a curved generally U-shaped guide track being nested within the inner nested track;
a movable trolley being accommodated and movable along the curved generally U-shaped guide track; and
a drive assembly being supported by a first end of the curved generally U-shaped guide track for conveying the movable trolley back and forth along the curved generally U-shaped guide track, and the movable trolley facilitates loading and unloading the item(s) to be delivered, wherein a first end of a cylinder housing of a first nested track cylinder is connected to the outer nested track while a free end of a piston of the first nested track cylinder is connected to the curved generally U-shaped guide track to facilitate sliding movement of the curved generally U-shaped guide track relative to the outer nested track.

17. The loading/unloading device according to claim 16, wherein the movable trolley comprises a shuttle base frame and a base connection member is supported by the shuttle base frame, and a platform motor connects the fork platform to the shuttle base frame to facilitate rotation of the fork platform at least 180 degrees with respect to the movable shuttle.

18. A delivery vehicle comprising at least one loading/unloading device for delivering an item(s) to be delivered, the delivery vehicle comprising a vehicle frame and a vehicle bed, and the at least one loading/unloading device comprising:
an outer nested track;
an inner nested track being nested within the outer nested track;
a curved generally U-shaped guide track being nested within the inner nested track;
a movable trolley being accommodated and movable along the curved generally U-shaped guide track, the movable trolley supporting a fork platform and the fork platform supports at least one pivotable fork for loading and unloading the item(s) to be delivered;
a drive assembly being supported by a first end of the curved generally U-shaped guide track for conveying the movable trolley back and forth along the curved generally U-shaped guide track to facilitate loading and unloading of the item(s) to be delivered on to or off of the vehicle bed of the delivery vehicle; and
at least first and second lifting members are provided for raising and lowering the outer nested track, the inner nested track, the curved generally U-shaped guide track and the movable trolley relative to the vehicle bed of the delivery vehicle.

19. A method forming a delivery vehicle having at least one loading/unloading device for delivering an item(s) to be delivered, and the delivery vehicle comprising a vehicle frame and a vehicle bed, and the method comprising:
providing an outer nested track;
nesting an inner nested track within the outer nested track;
nesting a curved generally U-shaped guide track within the inner nested track;
accommodating a movable trolley within and along the curved generally U-shaped guide track, the movable trolley supporting a fork platform and the fork platform supporting at least one pivotable fork for loading and unloading the item(s) to be delivered;
supporting a drive assembly at a first end of the curved generally U-shaped guide track for conveying the movable trolley back and forth along the curved generally U-shaped guide track to facilitate loading and unloading the item(s) to be delivered on to or off of the vehicle bed of the delivery vehicle; and
providing at least first and second lifting members for raising and lowering the outer nested track, the inner nested track, the curved generally U-shaped guide track and the movable trolley relative to the vehicle bed of the delivery vehicle.

* * * * *